(12) United States Patent
Shahu et al.

(10) Patent No.: US 12,346,611 B1
(45) Date of Patent: Jul. 1, 2025

(54) INFLIGHT-I/O-BASED STORAGE EMULATION SYSTEM

(71) Applicant: Dell Products L.P., Round Rock, TX (US)

(72) Inventors: Sunil Shahu, Ahmedabad (IN); Shyamkumar T. Iyer, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 18/543,346

(22) Filed: Dec. 18, 2023

(51) Int. Cl.
*G06F 3/06* (2006.01)
(52) U.S. Cl.
CPC ............ *G06F 3/0659* (2013.01); *G06F 3/061* (2013.01); *G06F 3/0679* (2013.01)
(58) Field of Classification Search
CPC ....... G06F 3/0659; G06F 3/061; G06F 3/0679
USPC .................................................. 711/154, 100
See application file for complete search history.

(56) References Cited

U.S. PATENT DOCUMENTS

2022/0342578 A1* 10/2022 Chen ................. G06F 3/0605

FOREIGN PATENT DOCUMENTS

KR 101532951 B1 7/2015

* cited by examiner

*Primary Examiner* — Hosain T Alam
*Assistant Examiner* — Zubair Ahmed
(74) *Attorney, Agent, or Firm* — Joseph Mencher

(57) ABSTRACT

An inflight-I/O-based storage emulation system includes a storage emulation device coupled to host devices, and to storage devices that provide primary, secondary, and metadata storage systems. The storage emulation device stores I/O commands directed to the primary storage system by the host devices in its I/O queue. If the storage emulation device predicts I/O operations for I/O commands in its I/O queue do not exceed a threshold, it executes at least some of those I/O commands to store first data in the primary storage system. If the storage emulation device predicts I/O operations for I/O commands in its I/O queue exceed the threshold, it executes at least some of those I/O commands to store second data in the secondary storage system, and provides mapping information in the metadata storage system that identifies storage location(s) in the primary storage system associated with the second data in the secondary storage system.

20 Claims, 21 Drawing Sheets

INFLIGHT-I/O-BASED STORAGE EMULATION SYSTEM

BACKGROUND

The present disclosure relates generally to information handling systems, and more particularly to providing emulated storage of data for an information handling system based on inflight Input/Output (I/O) commands.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop-notebook computing devices, tablet computing devices, mobile phones, and/or other "host" computing devices known in the art, sometimes utilize emulated storage systems for the storage of their data. Conventional emulated storage systems may be provided for use by multiple host computing devices (e.g., "physical" host provided on physical computing devices or "virtual" hosts provided on physical computing devices) via "downstream" ports connected to the physical storage devices that are used to provide the emulated storage system. However, in some situations, the host computing devices connected to conventional emulated storage systems can provide Input/Output (I/O) commands for the emulated storage system that can exceed the I/O command execution capabilities with the storage devices that provide the emulated storage system (e.g., a bandwidth of the downstream ports described above), which results in delays in I/O command execution and associated I/O operations with the storage devices that provide the emulated storage system and associated data operations performed by the host computing devices.

Accordingly, it would be desirable to provide an emulated storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage emulation engine that is configured to: store Input/Output (I/O) commands, which were generated by at least some of a plurality of host devices and that are directed to a first primary storage system that is provided by one or more of a plurality of storage devices that are coupled to the processing system, in a first primary storage system I/O queue; determine, during a first time period, that a first predicted I/O operation measurement that is based on first I/O commands stored in the first primary storage system I/O queue does not exceed a first primary storage system I/O operation threshold and, in response: execute at least some of the first I/O commands stored in the first primary storage system I/O queue to store first data in the first primary storage system; determine, during a second time period that is subsequent to the first time period, that a second predicted I/O operation measurement that is based on second I/O commands stored in the first primary storage system I/O queue exceeds the first primary storage system I/O operation threshold and, in response: execute at least some of the second I/O commands stored in the first primary storage system I/O queue to store second data in a first secondary storage system that is provided by the one or more of the plurality of storage devices; and provide, in the first metadata storage system that is provided by the one or more of the plurality of storage devices, second data mapping information that identifies at least one storage location in the first primary storage system associated with the second data stored in the first secondary storage system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
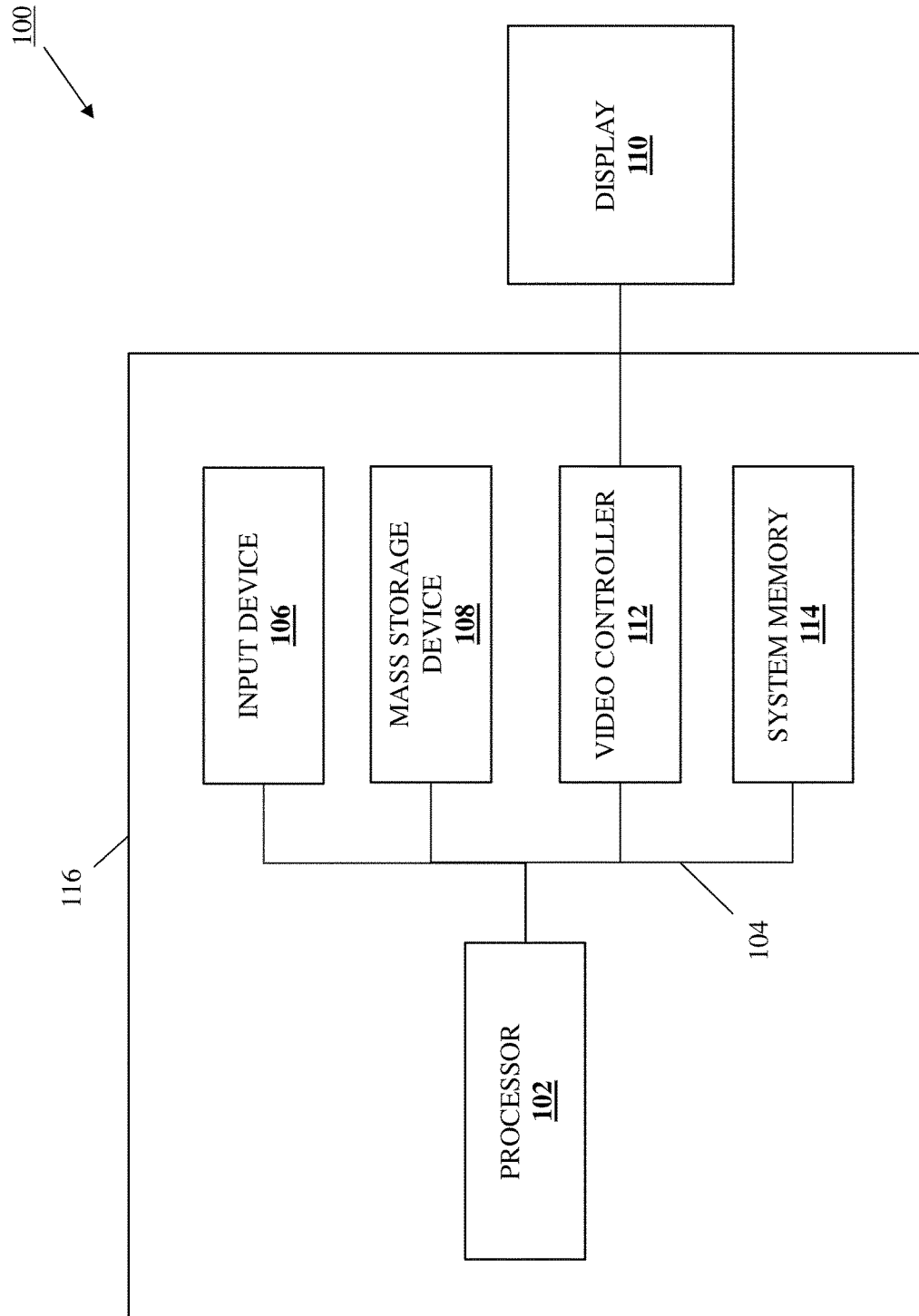
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
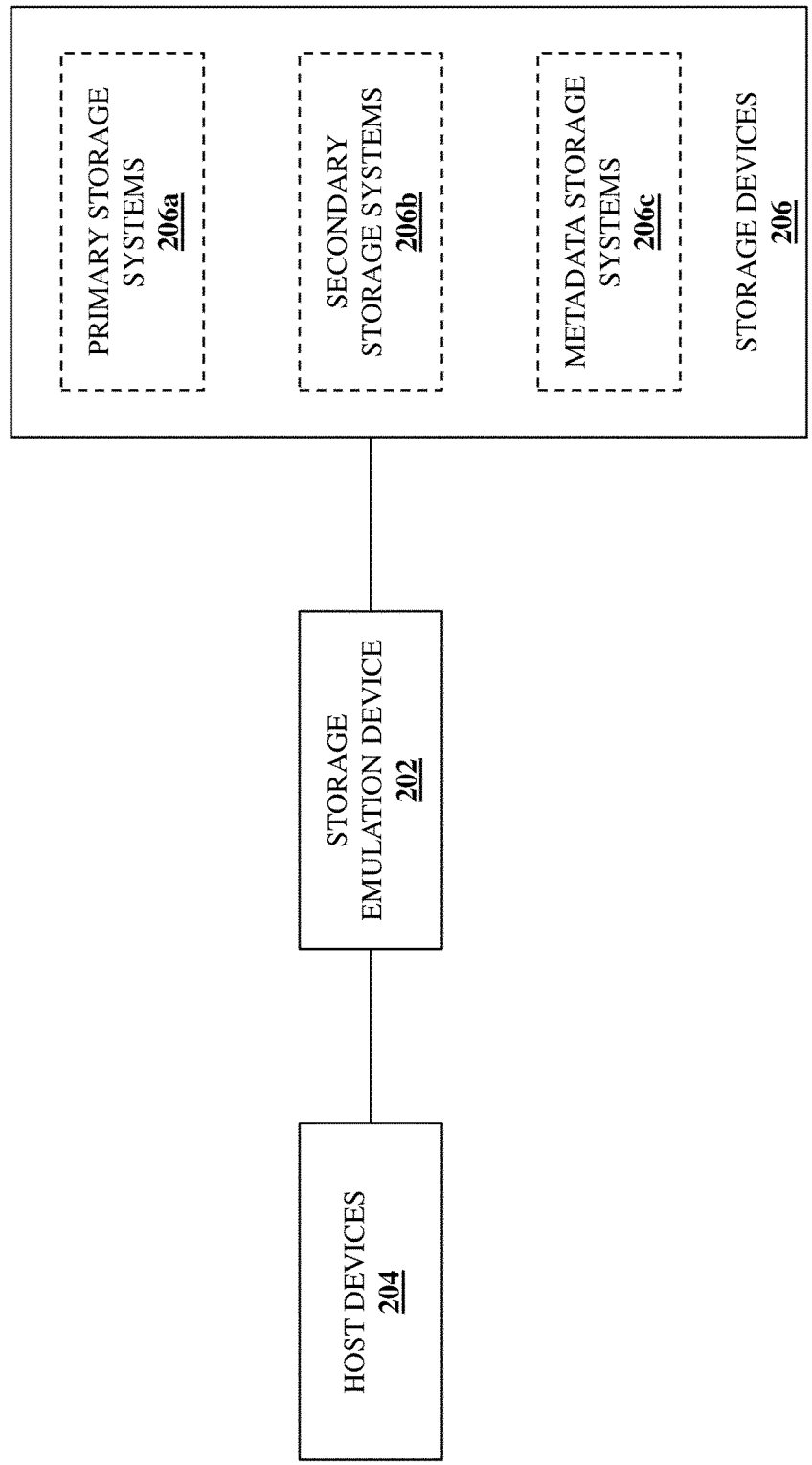
FIG. 2 is a schematic view illustrating an embodiment of a networked system that may provide the inflight-I/O-based storage emulation system of the present disclosure.

Referring now to FIG. 2, an embodiment of a networked system 200 is illustrated that may provide the inflight-I/O-based storage emulation system of the present disclosure. In the illustrated embodiment, the networked system 200 includes a storage emulation device 202. In an embodiment, the storage emulation device 202 may be provided by the IHS 100 discussed above with reference to FIG. 1, and/or may include some or all of the components of the IHS 100. In a specific example, the storage emulation device 202 may be provided by a Data Processing Unit (DPU), Infrastructure Processing Unit (IPU), or Smart Network Interface Controller (SmartNIC) that one of skill in the art in possession of the present disclosure will appreciate may be provided by a programmable computer processor that integrates a Central Processing Unit (CPU) with network interface hardware, and that may be used in place of conventional Network Interface Controllers (NICs) to relieve CPUs of complex networking responsibilities and other infrastructure duties. As such, in some embodiments the storage emulation device 202 may be included in the chassis of a server device and/or other computing device known in the art that may include the DPU, IPU, or SmartNIC described above.

In another specific example, the storage emulation device 202 may be provided by a System Control Processor (SCP) that may be conceptualized as an "enhanced" SmartNIC device that may be configured to perform functionality that is not available in conventional SmartNIC devices such as, for example, the storage emulation functionality described herein. As such, in some embodiments the storage emulation device 202 may be included in the chassis of a server device and/or other computing device known in the art that may include the SCP discussed above. In another specific example, the storage emulation device 202 may be provided by a storage controller. As such, in some embodiments the storage emulation device 202 may be included in the chassis of a storage device and/or other storage component known in the art that may include the storage controller discussed above. However, while the storage emulation functionality of the present disclosure is illustrated and described as being provided by particular storage emulation devices, one of skill in the art in possession of the present disclosure will appreciate that the storage emulation functionality described herein may be provided by other devices while remaining within the scope of the present disclosure as well.

A plurality of host devices 204 may be coupled to the storage emulation device 202 via a network (e.g., a Local Area Network (LAN), the Internet, combinations thereof, and/or other networks known in the art), via a direct connection (e.g., a Peripheral Component Interconnect express (PCIe) connection), and/or via other device couplings that would be apparent to one of skill in the art in possession of the present disclosure. In an embodiment, any or each of the host devices 204 may be provided by the IHS 100 discussed above with reference to FIG. 1 and/or may include some or all of the components of the IHS 100, and in specific examples may be provided by server devices, desktop computing devices, laptop-notebook computing devices, tablet computing devices, mobile phones, and/or other "host" computing devices known in the art, and one of skill in the art in possession of the present disclosure will appreciate how any of the host devices 204 may be physical hosts provided by respective physical computing devices, or virtual hosts provided on physical computing devices. Furthermore, while illustrated and discussed as being provided by particular computing devices, one of skill in the art in possession of the present disclosure will recognize that the functionality of the host devices 204 discussed below may be provided by other devices that are configured to operate similarly as the host devices 204 discussed below.

A plurality of storage devices 206 may be coupled to the storage emulation device 202 via a network (e.g., a LAN, the Internet, combinations thereof, and/or other networks known in the art), via a direct connection (e.g., a Peripheral Component Interconnect express (PCIe) connection), and/or via other device couplings that would be apparent to one of skill in the art in possession of the present disclosure. In an embodiment, any or each of the storage devices 206 may be provided by Hard Disk Drive (HDD) storage devices, Solid State Drive (SSD) storage devices, Serial Advance Attached Technology Attachment (SATA) storage devices, Small Computer System Interface (SCSI) storage devices, Non-Volatile Memory express (NVMe) storage devices, and/or other types of storage devices that would be apparent to one of skill in the art in possession of the present disclosure. Furthermore, while illustrated and discussed as being provided by particular storage devices, one of skill in the art in possession of the present disclosure will recognize that the functionality of the storage devices 206 discussed below may be provided by other storage components that are configured to operate similarly as the storage devices 206 discussed below.

As illustrated, the storage devices 206 may be configured to provide a plurality of primary storage systems 206a, a plurality of secondary storage systems 206b, and a plurality of metadata storage systems 206c, any of which may be utilized like the primary storage system, the secondary storage system, and the metadata storage system described below. As described below, a corresponding secondary storage system and a corresponding metadata storage system may be provided and utilized with any particular primary storage system that is provided for use by the host devices 204 (i.e., the storage devices 206 provide storage system groups that each include a primary storage system/secondary storage system/metadata storage system combination, and each storage system group may be provided by use by one or more of the host devices 204). Furthermore, one of skill in the art in possession of the present disclosure will appreciate how each of the secondary storage systems 206b may be provided using different storage devices than the corresponding primary storage system in its storage system group, while any of the metadata storage systems 206c may be provided using the same or different storage devices than the corresponding secondary storage system in its storage system group. However, while a specific networked system 200 has been illustrated and described, one of skill in the art in possession of the present disclosure will recognize that the inflight-I/O-based storage emulation system of the present disclosure may include a variety of components and component configurations while remaining within the scope of the present disclosure as well.

Figure 3:
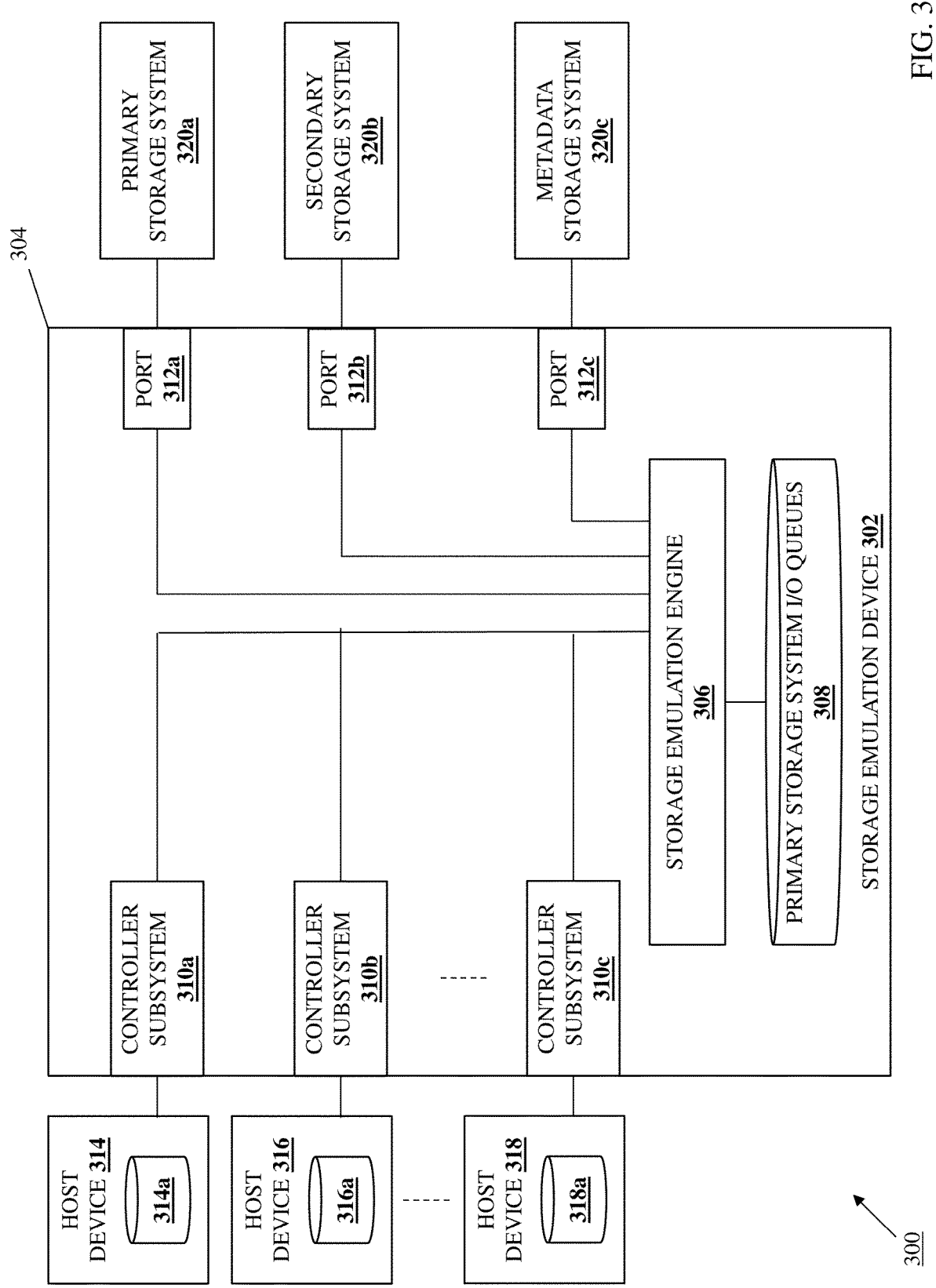
FIG. 3 is a schematic view illustrating an embodiment of the networked system of FIG. 2.

Referring now to FIG. 3, an embodiment of networked system 300 is illustrated for purposes of the discussion provided below that includes an example of the networked system 200 discussed above with reference to FIG. 2 providing a single storage system group, and one of skill in the art in possession of the present disclosure will appreciate how the networked system 200 may provide a plurality of storage system groups that are similar to the storage system group provided as illustrated and described with reference to FIG. 3. As illustrated, the networked system 300 includes a storage emulation device 302 that may provide the storage emulation device 202 discussed above with reference to FIG. 2, and thus may be provided by a DPU, IPU, Smart-NIC, SCP, storage controller, and/or other storage emulation device that would be apparent to one of skill in the art in possession of the present disclosure. As discussed above, while illustrated and described as being provided by particular devices, one of skill in the art in possession of the present disclosure will recognize that the functionality of the storage emulation device 302 discussed below may be provided by other devices that are configured to operate similarly as the storage emulation device 302 discussed below.

In the illustrated embodiment, the storage emulation device 302 includes a chassis 304 that houses the components of the storage emulation device 302, only some of which are illustrated and described below. For example, the chassis 304 may house a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide a storage emulation engine 306 that is configured to perform the functionality of the storage emulation engines, storage emulation subsystems, and/or storage emulation devices discussed below.

The chassis 304 may also house a storage component (not illustrated, but which may be similar to the memory 114 or storage 108 discussed above with reference to FIG. 1) that is coupled to the storage emulation engine 306 (e.g., via a coupling between the storage component and the processing system) and that, in the embodiments illustrated and described below, includes primary storage system I/O queues 308. As will be appreciated by one of skill in the art in possession of the present disclosure, the storage component in the chassis 304 of FIG. 3 may be configured by the storage emulation engine 306 to provide I/O queues for primary storage systems that may be used to store I/O commands received from the host devices as described in further detail below. As such, one of skill in the art in possession of the present disclosure will appreciate that, while the primary storage system I/O queue 308 is described below as providing I/O queues for a particular primary storage system, similar primary storage system I/O queues may be provided for each of the primary storage systems in the networked system 200 discussed above with reference to FIG. 2.

As described above, the storage emulation device 302 is configured to be coupled to host devices. As such, in the illustrated embodiment, the chassis 304 of the storage emulation device 302 includes controller subsystems 310a, 310b, and up to 310c that one of skill in the art in possession of the present disclosure will recognize may be provided by NVMe controller subsystem that include ports (e.g., "upstream" ports), controllers, and/or other components that are configured to interface with host devices according to the NVMe interface specification. However, while illustrated as being provided by controller subsystems, one of skill in the art in possession of the present disclosure will appreciate how other host devices couplings (and host interface technologies) may be utilized in place of the controller subsystems 310a-310c while remaining within the scope of the present disclosure as well.

As also described above, the storage emulation devices is configured to be coupled to storage devices. As such, in the illustrated embodiment, the chassis 304 of the storage emulation device 302 includes ports 312a, 312b, and up to 312c (e.g., "downstream" ports) that one of skill in the art in possession of the present disclosure will recognize are configured to couple to the storage devices 206 discussed above with reference to FIG. 2. However, while illustrated as being provided by ports, one of skill in the art in possession of the present disclosure will appreciate how other storage devices couplings may be utilized in place of the ports 312a-312c while remaining within the scope of the present disclosure as well.

In the specific example illustrated in FIG. 3, a plurality of host devices 314, 316, and up to 318 are coupled to the storage emulation device 302 via the controller subsystems 310a, 310b, and up to 310c, respectively, with each of the host devices 314-318 including a host device I/O queue 314a, 316a, and up to 318a, respectively. Furthermore, the specific example illustrated in FIG. 3 includes a primary storage system 320a (e.g., one of the primary storage systems 206a discussed above with reference to FIG. 2) coupled to the port 312a, a secondary storage system 320b (e.g., one of the secondary storage systems 206b discussed above with reference to FIG. 2) coupled to the port 312b, and a metadata storage system 320c (e.g., one of the metadata storage systems 206c discussed above with reference to FIG. 2) coupled to the port 312c, and one of skill in the art in possession of the present disclosure will recognize how the storage emulation engine 306 may configure the storage devices 206 discussed above with reference to FIG. 2 to provide the primary storage system 320a, the secondary storage system 320b, and the metadata storage system 320c, may identify the primary storage system 320a to the host devices 314-318 for use in their storage operations, may configure the primary storage system I/O queues 308 for use in storing I/O commands for the primary storage system 320a, and/or may perform any other storage emulation operations that one of skill in the art in possession of the present disclosure would recognize as allowing the host devices 314-318 to provide data for storage in the primary storage system 320a, as well as utilize the secondary storage system 320b and the metadata storage system 320c as described below.

As will be appreciated by one of skill in the art in possession of the present disclosure and as described above, the host devices 314-318 may be subsets of the host devices 204 discussed above with reference to FIG. 2, and may be provided a storage system group that includes the primary storage system 320a, the secondary storage system 320b, and the metadata storage system 320c. However, while a specific networked system 300 has been illustrated and described, one of skill in the art in possession of the present disclosure will recognize that inflight-I/O-based storage emulation system of the present disclosure may include a variety of components and/or component configurations for providing conventional storage emulation functionality, as well as the inflight-I/O-based storage emulation functionality discussed below, while remaining within the scope of the present disclosure as well.

Figure 4:
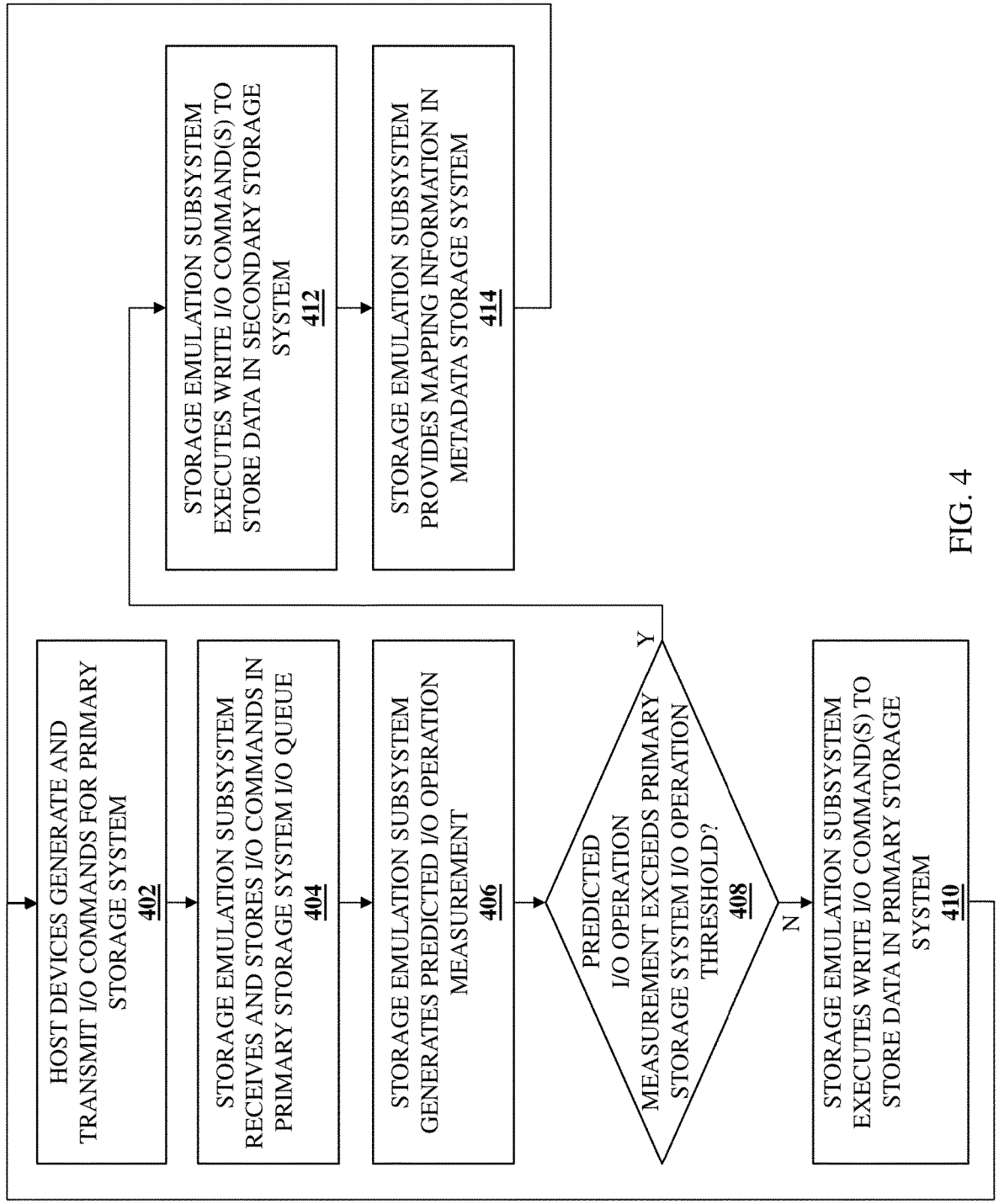
FIG. 4 is a flow chart illustrating an embodiment of a method for emulating a storage system based on inflight I/O commands.
Figure 5:
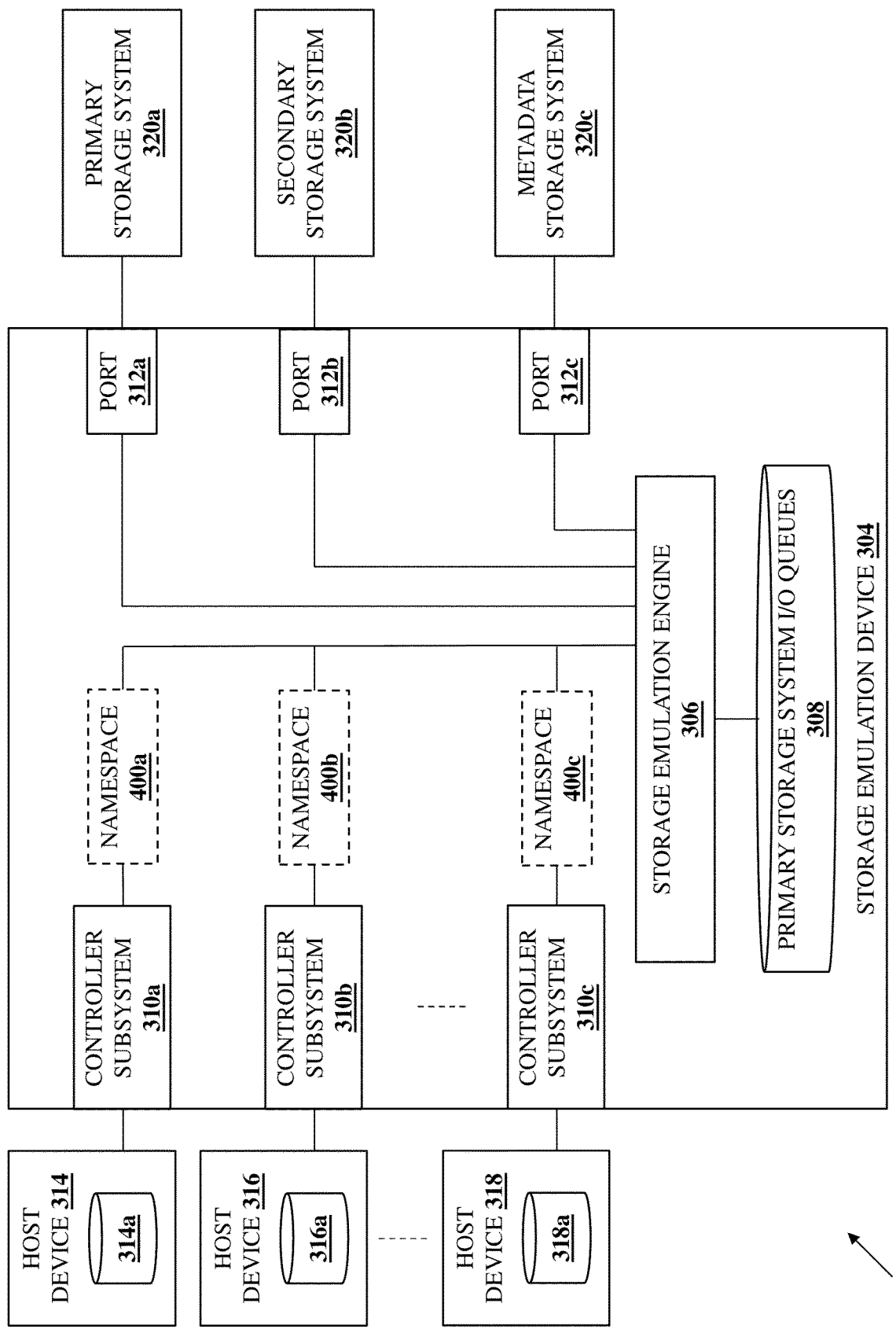
FIG. 5 is a schematic view illustrating an embodiment of the networked system of FIG. 3 operating during the method of FIG. 4.

Referring now to FIG. 4, an embodiment of a method 400 for emulating a storage system based on inflight Input/Output (I/O) commands is illustrated. As discussed below, the systems and methods of the present disclosure provide for the monitoring of inflight I/O commands for a primary storage system to determine whether to execute write I/O commands to store data in that primary storage system, or to execute write I/O commands to store data temporarily in a secondary storage system before copying it to the primary storage system. For example, the inflight-I/O-based storage emulation system of the present disclosure may include a storage emulation device coupled to host devices, and to storage devices that provide primary, secondary, and metadata storage systems. The storage emulation device stores I/O commands directed to the primary storage system by the host devices in its I/O queue. If the storage emulation device predicts I/O operations for I/O commands in its I/O queue do not exceed a threshold, it executes at least some of those I/O commands to store first data in the primary storage system. If the storage emulation device predicts I/O operations for I/O commands in its I/O queue exceed the threshold, it executes at least some of those I/O commands to store second data in the secondary storage system, and provides mapping information in the metadata storage system that identifies storage location(s) in the primary storage system associated with the second data in the secondary storage system. As such, I/O command execution and/or I/O operation delays for the primary storage system and associated host device data operation delays caused by primary storage system I/O operation bottlenecks are eliminated.

In a specific embodiment, during or prior to the method 400, the storage emulation engine 306 may configure a plurality of logical namespaces for the primary storage system 320a in association with the storage system group that includes the primary storage system 320, which in the illustrated embodiment includes a namespace 400a provided in association with the controller subsystem 310a, a namespace 400b provided in association with the controller subsystem 310b, and up to a namespace 400b provided in association with the controller subsystem 310c. While not illustrated, as described above, similar namespaces may be provided for any primary storage subsystem included in a storage system group provided by the storage emulation engine 306 for other subsets of the host devices 204. Furthermore, while a respective namespace 400a, 400b, and up to 400c is provided for each of the plurality of controller subsystems 310a, 310b, and up to 310c that are described below as being used by the host devices 314, 316, and up to 318, respectively, one of skill in the art in possession of the present disclosure will appreciate how multiple namespaces may be provided is association with any particular controller subsystem, and any combination of host devices may use any combination of namespaces (including multiple host devices sharing a single namespace), while remaining within the scope of the present disclosure.

Figure 6:
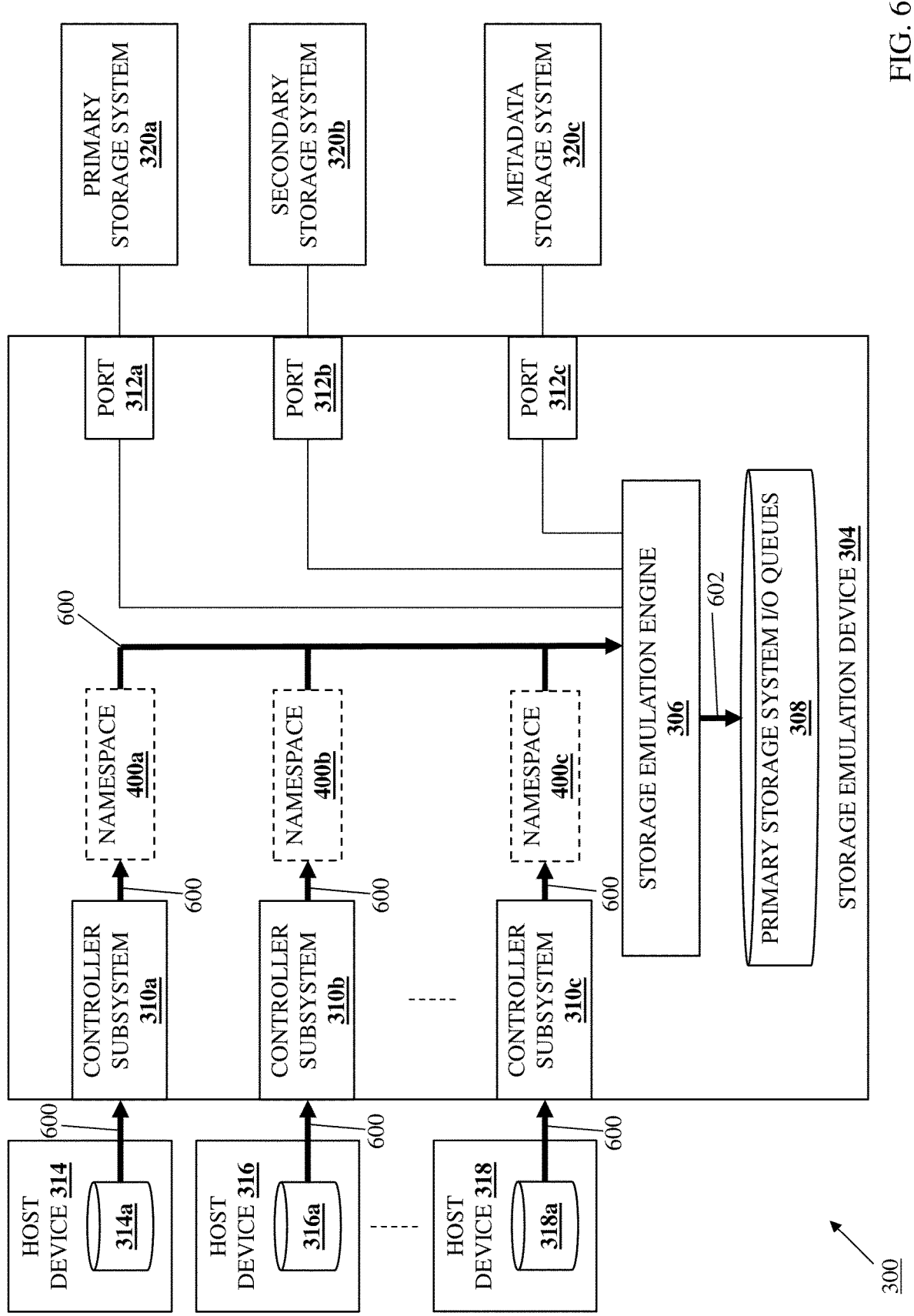
FIG. 6 is a schematic view illustrating an embodiment of the networked system of FIG. 3 operating during the method of FIG. 4.

The method 400 begins at block 402 where host devices generate and transmit I/O commands for a primary storage system. With reference to FIG. 6, in an embodiment of block 402, each of the host devices 314, 316, and up to 318 may perform I/O command transmission operations that may include generating I/O commands, providing those I/O commands in their respective host I/O queues 314a, 316a, and up to 318a, and notifying their connected controller subsystem of the I/O command (e.g., using an NVMe queue "doorbell"). In the illustrated embodiment, the host device 314 may generate read I/O commands, write I/O commands, and/or other I/O commands that are directed to the namespace 400a associated with the primary storage system 320a; the host device 316 may generate read I/O commands, write I/O commands, and/or other I/O commands that are directed to the namespace 400b associated with the primary storage system 320a; and the host device 318 may generate read I/O commands, write I/O commands, and/or other I/O commands that are directed to the namespace 400c associated with the primary storage system 320a, although one of skill in the art in possession of the present disclosure will appreciate how I/O commands may be provided for the primary storage system 320a in a variety of other manners that will fall within the scope of the present disclosure as described above.

The method 400 then proceeds to block 404 where a storage emulation subsystem receives and stores the I/O commands in a primary storage system I/O queue. With continued reference to FIG. 6, in an embodiment of block 404, the storage emulation device 304 may perform I/O command retrieval/storage operations 600 that, in the illustrated embodiment, may include the controller subsystems 310a, 310b, and up to 310c retrieving the I/O commands from the host device queues 314a, 314b, and up to 318a, respectively, and providing those I/O commands to the storage emulation engine 306 such that the storage emulation engine 306 stores those I/O commands in the primary storage system I/O queues 308 that, as described above, may have been previously provided by the storage emulation engine 306 for the primary storage system 320a. However, while a specific example of the provisioning of I/O commands to the storage emulation device 304 has been described (e.g., via the use of NVMe I/O command provisioning techniques), one of skill in the art in possession of the present disclosure will appreciate how I/O commands may be provided to the storage emulation device 304 in a variety of other manners that will fall within the scope of the present disclosure as well.

The method 400 then proceeds to block 406 where the storage emulation subsystem generates a predicted I/O operation measurement. In an embodiment, at block 406, the storage emulation engine 306 may perform predicted I/O operation measurement generation operations that may include using the I/O commands in the primary storage system I/O queues 308 for the primary storage system 320a that have not yet been executed with the primary storage system 320a (e.g., "inflight" I/O commands that may include write I/O commands, read I/O commands, the copying of data from the secondary storage system 320b to the primary storage system 320a discussed in further detail below, and/or any other "inflight" I/O commands that would be apparent to one of skill in the art in possession of the present disclosure) in order to generate a predicted I/O operation measurement. In some examples, the storage emulation engine 306 may generate the predicted I/O operation measurement based on I/O commands that it previously stored in the primary storage system I/O queues 308 for the primary storage system 320a (i.e., the predicted I/O operation measurement may be based on an analysis of I/O commands currently stored in the primary storage system I/O queues 308 for the primary storage system 320a). However, in other examples, the storage emulation engine 306 may generate the predicted I/O operation measurement during the process of storing I/O commands in the primary storage system I/O queues 308 for the primary storage system 320a (i.e., the predicted I/O operation measurement may be based on I/O commands analyzed immediately prior to their storage in the primary storage system I/O queues 308 for the primary storage system 320a).

In an embodiment, the predicted I/O operation measurement may include a prediction of a future I/O Per Second (IOPS) metric that identifies a number of I/O operations that will be required at one or more times in the future based on the execution of those I/O commands with the primary storage system 320a, and/or any other I/O operation measurement that predicts how the execution of those I/O commands (e.g., read I/O commands, write I/O commands, etc.) will result in I/O operations using the processing system that provides the storage emulation engine 306, the port 312a and other fabric connections between the storage emulation engine 306 and the primary storage system 320a, the storage processing system in the primary storage system 320a, the storage media in the primary storage system 320a, and/or any other I/O operation components that would be apparent to one of skill in the art in possession of the present disclosure.

To provide a specific example, some I/O commands may provide a single I/O command (e.g., a read I/O command or a write I/O command) for a single Logical Block Address (LBA), while other I/O commands can point to a list of buffers for use with data and multiple LBAs (e.g., an NVMe Physical Region Page (PRP) entry may point to buffers and a number of LBA fields) that will require multiple read I/O operations and/or write I/O operations. As such, the number of I/O operations required for any particular I/O command may vary, and may be considered as part of the predicted I/O operation measurement at block 406. Furthermore, the size of the I/O operation requested by an I/O command (e.g., data write operation(s), data read operation(s), etc.) may vary, and may be considered as part of the predicted I/O operation measurement at block 406 as well. Further still, any I/O operation being used to generate the predicted I/O operation measurement may be affected by other I/O operations that are used to generate the predicted I/O operation measurement, and thus such I/O operation "interactions" may be considered as part of the predicted I/O operation measurement at block 406 as well. However, while a few specific examples have been provided, one of skill in the art in possession of the present disclosure will appreciate how the predicted I/O operation measurements based on inflight I/O commands may be generated using a variety of techniques that will fall within the scope of the present disclosure as well.

The method 400 then proceeds to decision block 408 where the method proceeds depending on whether the predicted I/O operation measurement exceeds a primary storage system I/O operation threshold. In an embodiment, at decision block 408, the storage emulation engine 306 may compare the predicted I/O operation measurement (e.g., the IOPS metric described in the example provided above) with a primary storage system I/O operation threshold that, for example, identifies a threshold of I/O operations that may be executed with the primary storage system 320a while producing no more than a maximum desired I/O execution latency, and/or provides other I/O operation thresholds that would be apparent to one of skill in the art in possession of the present disclosure. For example, the primary storage system I/O operation threshold may be based on I/O operations that are currently being executed with the primary storage system 320a (e.g., a current state of I/O operations based on I/O command execution with the primary storage system 320a), a theoretical maximum I/O operation execution capability of the primary storage system 320a (e.g., a theoretical maximum IOPS) that may be based on the I/O operation execution capabilities of the processing system that provides storage emulation engine 306, the port 312a and other fabric connections between the storage emulation engine 306 and the primary storage system 320*a*, the storage processing system in the primary storage system 320*a*, the storage media in the primary storage system 320*a*, and/or any other I/O operation execution components that would be apparent to one of skill in the art in possession of the present disclosure, and/or any other factors that one of skill in the art in possession of the present disclosure would recognize as affecting the I/O command execution and/or I/O operation process. However, while a specific example of a primary storage system I/O operation threshold has been described, one of skill in the art in possession of the present disclosure will appreciate how a variety of primary storage system I/O operation thresholds will fall within the scope of the present disclosure as well.

Figure 7:
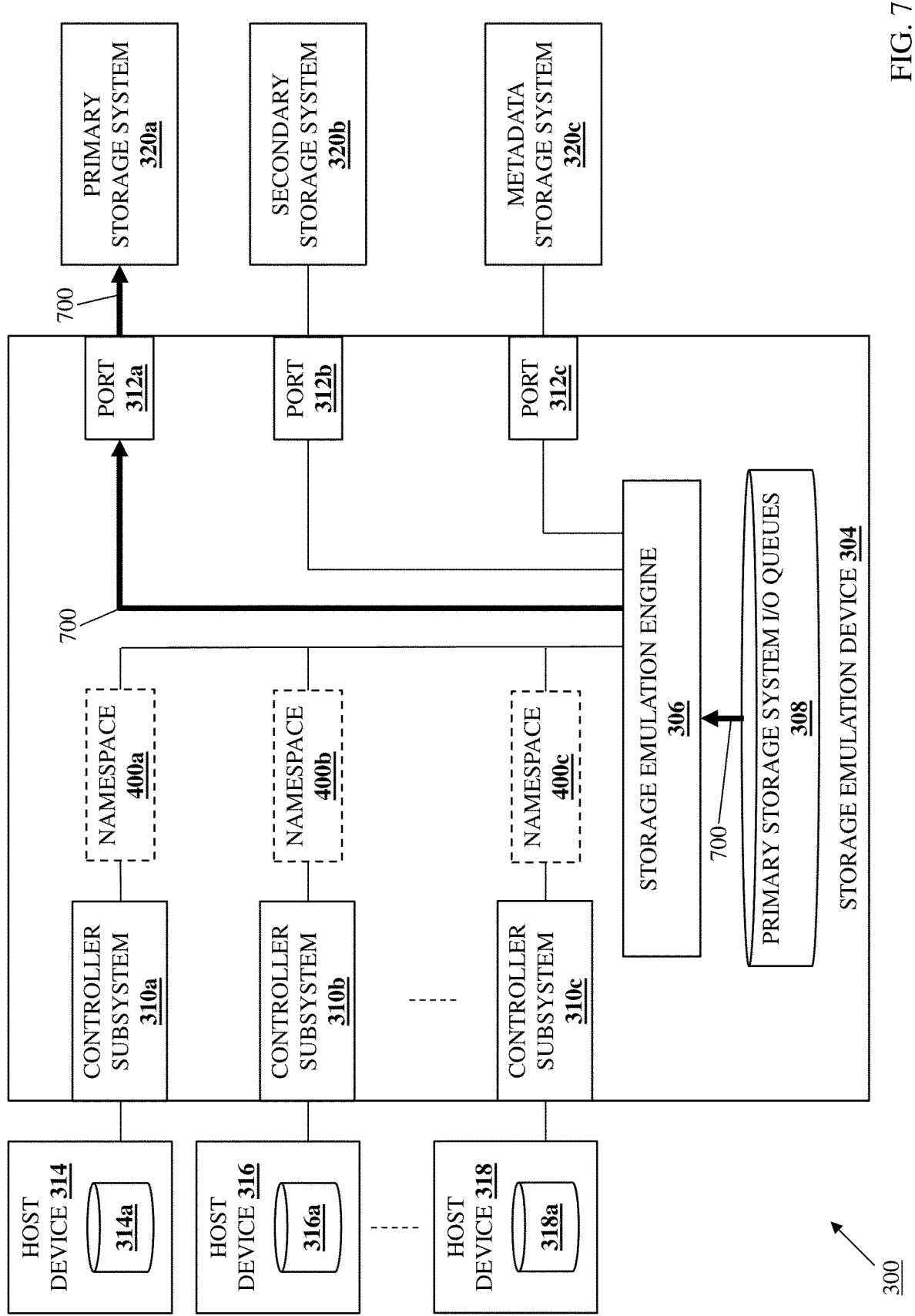
FIG. 7 is a schematic view illustrating an embodiment of the networked system of FIG. 3 operating during the method of FIG. 4.

If, at decision block 408, the predicted I/O operation measurement does not exceed the primary storage system I/O operation threshold, the method 400 proceeds to block 410 where the storage emulation subsystem executes one or more write I/O commands to store data in the primary storage system. With reference to FIG. 7, in an embodiment of block 410 and in response to the predicted I/O operation measurement not exceeding the primary storage system I/O operation threshold at decision block 408, the storage emulation engine 306 may perform I/O command execution operations 700 that may include retrieving write I/O commands from the primary storage system I/O queues 308 for the primary storage system 320*a*, and executing those write I/O commands via the port 312*a* and with the primary storage system 320*a* in order to store data provided in those I/O write commands in the primary storage system 320*a*.

While not illustrated, one of skill in the art in possession of the present disclosure will appreciate how the storage emulation engine 306 may follow the storage of the data in the primary storage system 320*a* by generating and transmitting a write completion communication to the host device that provided the I/O command that included that data, with that write completion communication identifying the primary storage system storage location of that data in the primary storage system 320*a* (e.g., one or more LBAs associated with the physical storage location of that data in the primary storage system 320*a*).

The method 400 then returns to block 402. As such, the method 400 may loop such that the storage emulation engine 306 receives and stores I/O commands at block 404 and, as long predicted I/O operation measurements generated at block 406 do not exceed the primary storage system I/O operation threshold, the storage emulation engine 306 executes write I/O commands to store data in the primary data storage system 320*a*. In some examples, the generation of the predicted I/O operation measurement at block 406 across consecutive iterations of the method 400 may be spaced apart based on an amount of time (e.g., the storage emulation engine 306 may execute write I/O commands as per block 410 and receive and store I/O commands as per block 404 for some time period subsequent to the generation of a "most-recent" predicted I/O operation measurement and prior to the generation of a "next" predicted I/O operation measurement).

In other examples, the amount of "time" between generation of the predicted I/O operation measurements at consecutive iterations of block 406 of the method 400 may be spaced apart based on a number or frequency of I/O commands received (e.g., the storage emulation engine 306 may execute write I/O commands as per block 410 and store I/O commands as per block 404 subsequent to the generation of a most-recent predicted I/O operation measurement, and will generate a next predicted I/O operation measurement once a threshold number of I/O commands is received, or I/O commands are received at a threshold frequency). In yet other examples, the amount of "time" between generation of the predicted I/O operation measurements at consecutive iterations of block 406 of the method 400 may be spaced apart based on a number or frequency of executed write I/O commands (e.g., the storage emulation engine 306 may execute write I/O commands as per block 410 and store I/O commands as per block 404 subsequent to the generation of a most-recent predicted I/O operation measurement, and will generate a next predicted I/O operation measurement once a threshold number of write I/O commands is executed, or I/O commands are executed at a threshold frequency). However, while several specific examples have been provided, one of skill in the art in possession of the present disclosure will appreciate how the amount of "time" between generation of the predicted I/O operation measurements at consecutive iterations of block 406 of the method 400 may be spaced apart based on any of a variety of predicted I/O operation measurement generation factors that would be apparent to one of skill in the art in possession of the present disclosure.

Figure 8:
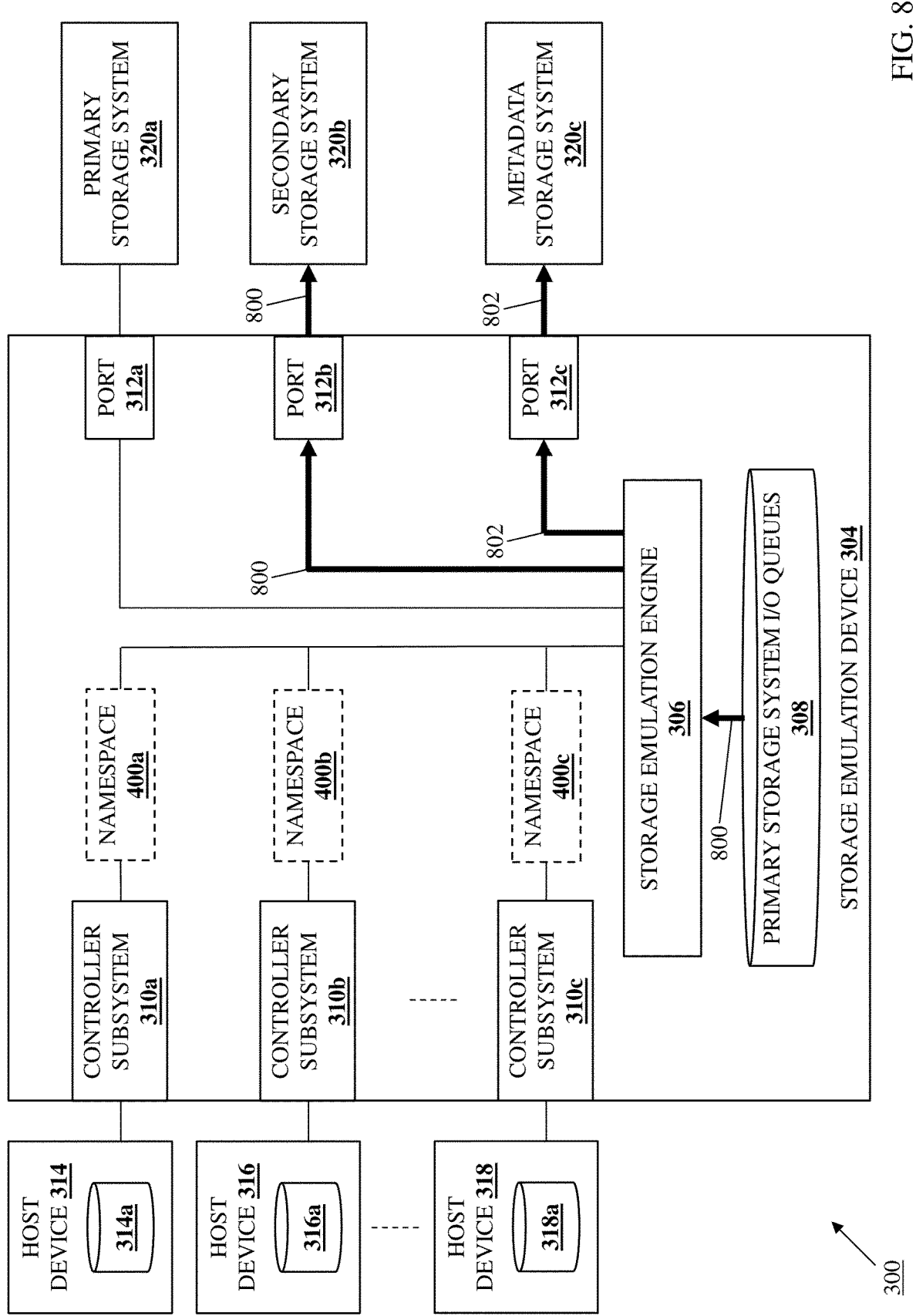
FIG. 8 is a schematic view illustrating an embodiment of the networked system of FIG. 3 operating during the method of FIG. 4.

If, at decision block 408, the predicted I/O operation measurement exceeds the primary storage system I/O operation threshold, the method 400 proceeds to block 412 where the storage emulation subsystem executes one or more write I/O commands to store data in a secondary storage system. With reference to FIG. 8, in an embodiment of block 412 and in response to the predicted I/O operation measurement exceeding the primary storage system I/O operation threshold at decision block 408, the storage emulation engine 306 may perform I/O command execution operations 800 that may include retrieving write I/O commands from the primary storage system I/O queues 308 for the primary storage system 320*a*, and executing those write I/O commands via the port 312*b* and with the secondary storage system 320*b* in order to store data provided in those I/O write commands in the secondary storage system 320*b*. As will be appreciated by one of skill in the art in possession of the present disclosure, the writing of the data in the secondary storage system 320*b* may include writing that data to a secondary storage system storage location in the secondary storage system 320*b* (e.g., writing that data to one or more LBAs associated with physical storage locations in the secondary storage system 320*b*).

While not illustrated, following the storage of the data in the secondary storage system 320*a*, the storage emulation engine 306 may generate and transmit a write completion communication to the host device that provided the I/O command that included that data. For example, the storage emulation engine 306 may determine a primary storage system storage location in the primary storage system 320*a* (e.g., one or more LBAs associated with the physical storage location in the primary storage system 320*a*) to which the data that was stored in the secondary storage system 320*b* at block 412 will be subsequently moved (discussed in further detail below), and the write completion communication for the data that was stored in the secondary storage system 320*b* at block 412 may identify that primary storage system storage location. Furthermore, as discussed below, the primary storage system storage location in the primary storage system 320*a* determined at block 412 may be utilized in the mapping information that is stored in the metadata storage system 320*c* as discussed in further detail below.

The method 400 then proceeds to block 414 where the storage emulation subsystem provides mapping information in a metadata storage system. With continued reference to FIG. 8, in an embodiment of block 414, the storage emulation engine 306 may perform mapping information provisioning operations 802 that may include generating mapping information based on the storage of the data in the secondary storage system 320b at block 412, and writing that mapping information via the port 312c and in the metadata storage system 320c (e.g., appending any existing mapping information in a log stored in the metadata storage system 320c with new mapping information). As will be appreciated by one of skill in the art in possession of the present disclosure, the mapping information generated and stored at block 414 may associate the secondary storage system storage location in the secondary storage system 320b in which the data was stored at block 412, and the primary storage system storage location in the primary storage system 320a to which that data will be subsequently moved, and/or may include any of a variety of mapping information that one of skill in the art in possession of the present disclosure would recognize as providing the functionality described below. However, while specific examples of mapping information have been described, one of skill in the art in possession of the present disclosure will appreciate how a variety of mapping information will fall within the scope of the present disclosure as well.

The method 400 then returns to block 402. As such, the method 400 may loop such that the storage emulation engine 306 receives and stores I/O commands at block 404 and, as long predicted I/O operation measurements generated at block 406 exceed the primary storage system I/O operation threshold, the storage emulation engine 306 executes write I/O commands to store data in the secondary data storage system 320b, while storing mapping information for that data in the metadata storage system 320c. Similarly as described above, the generation of the predicted I/O operation measurement at block 406 across consecutive iterations of the method 400 may be spaced apart based on an amount of time that may be calculated based on a time elapsed, a number or frequency of I/O commands received, a number or frequency of executed write I/O commands, and/or based any of predicted I/O operation measurement generation factors that would be apparent to one of skill in the art in possession of the present disclosure.

As such, the method 400 details how write I/O commands will be executed to store their associated data in either the primary storage system 320a or the secondary storage system 320b based on whether a predicted I/O operation measurement for I/O commands stored in the primary storage system I/O queue for the primary storage system 320a reaches a primary storage system I/O operation threshold, and one of skill in the art in possession of the present disclosure will appreciate how the primary storage system I/O operation threshold may be selected to ensure that latency in executing write I/O commands provided for the primary storage system 320a by the host devices 314-318 is minimized by executing those write I/O commands to store their data in the secondary storage system 320b when the I/O operations associated with the primary storage system 320a are predicted to introduce more than a desired amount of latency. However, one of skill in the art in possession of the present disclosure will appreciate how the storage in the secondary storage system 320b of data from write I/O commands provided for the primary storage system 320a by the host devices 314-318 requires modification to any subsequent conventional read I/O operations for that data.

Figure 9:
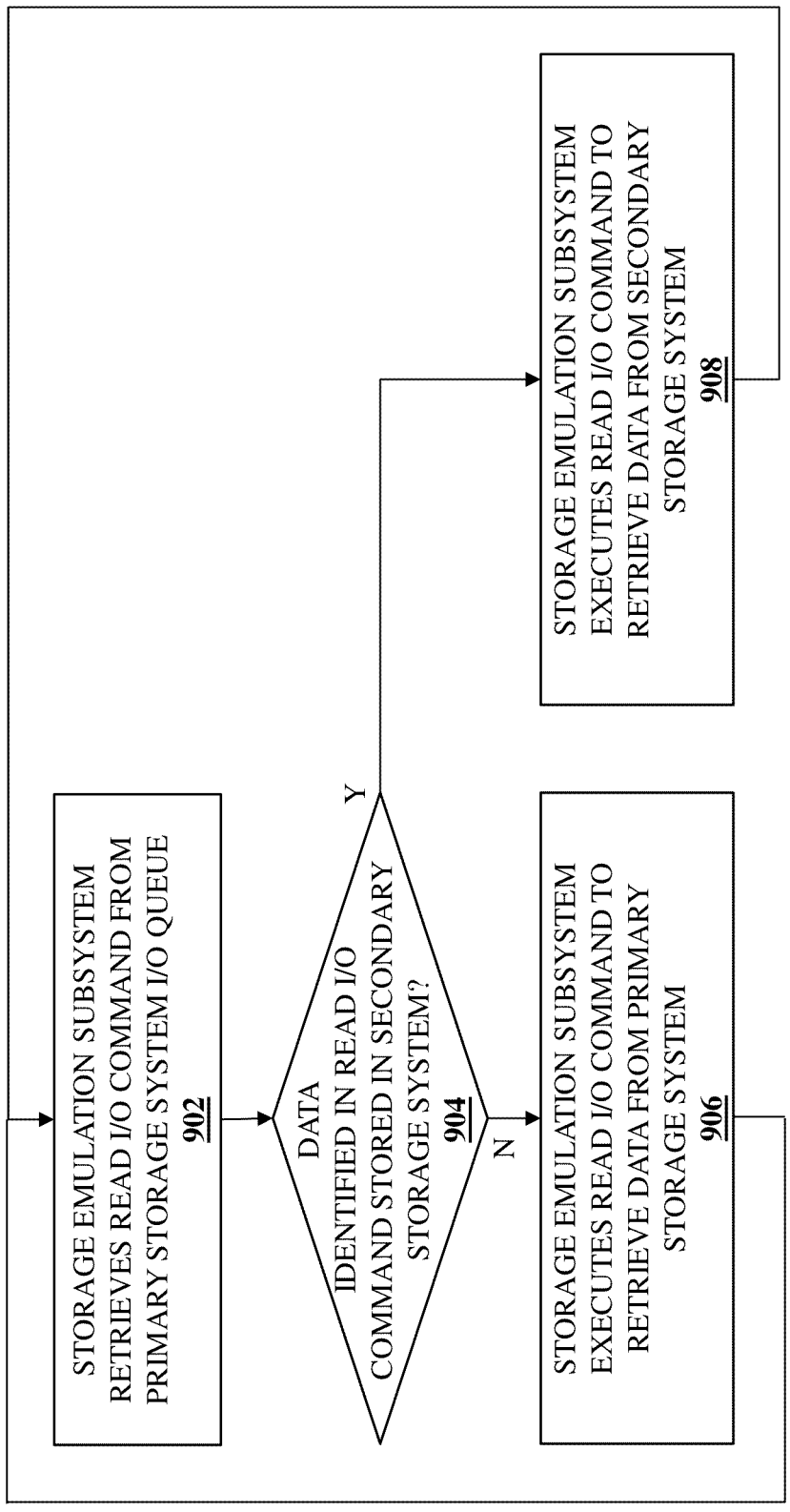
FIG. 9 is a flow chart illustrating an embodiment of a method for emulating a storage system based on inflight I/O commands.
Figure 10:
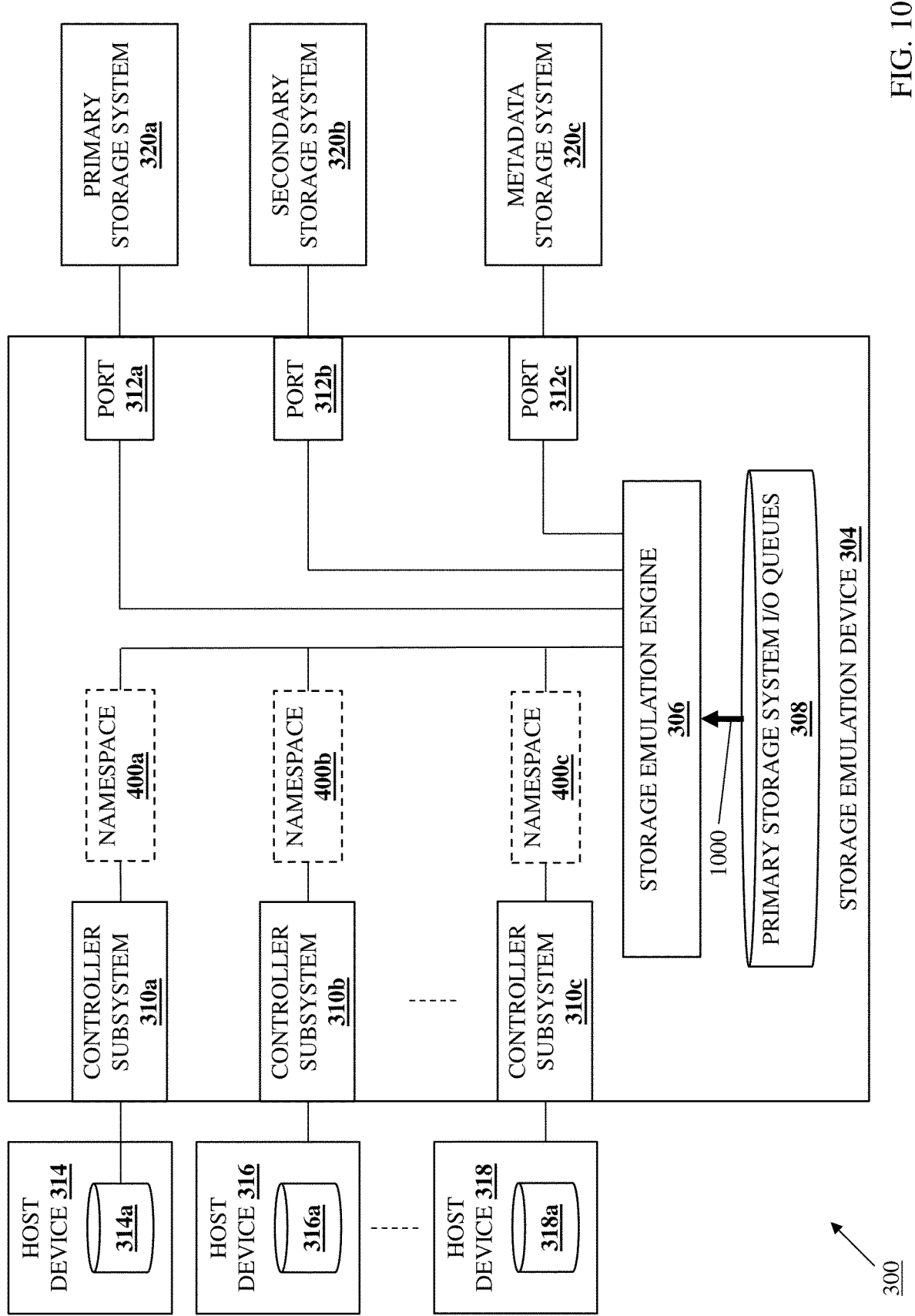
FIG. 10 is a schematic view illustrating an embodiment of the networked system of FIG. 3 operating during the method of FIG. 9.

Referring now to FIG. 9, an embodiment of a method 900 for emulating a storage system based on inflight Input/Output (I/O) commands is illustrated. As discussed below, the systems and methods of the present disclosure provide for the identification that a read I/O command includes data that was provided for storage in a primary storage system but that was stored in a secondary storage system and, in response, executes that read I/O command to retrieve that data from the secondary storage system. As such, data in write I/O commands directed to a primary storage system may be temporarily stored in a secondary storage system and retrieved and provisioned in response to read I/O commands while it remains stored in that secondary storage system.

The method 900 begins at block 902 where the storage emulation subsystem retrieves read I/O commands from the primary storage system queue. In an embodiment, at block 902, the storage emulation engine 306 may perform read I/O command retrieval operations 1000 that may include retrieving a read I/O command from the primary storage system I/O queues 308 for the primary storage system 320a. As will be appreciated by one of skill in the art in possession of the present disclosure, the read I/O command may have been received and stored in the primary storage system I/O queues 308 for the primary storage system 320a at block 404 of the method 400 following its generation and transmission by any of the host devices 314-318 at block 402 of the method 400 similarly as described above.

The method 900 then proceeds to decision block 904 where the method proceeds depending on whether data identified in the read I/O command is stored in the secondary storage system. As discussed above, the storage of data in the primary storage system 320a during the method 400 is followed by the generation and transmission of a write completion communication that identifies a storage location in the primary storage system 320a to which that data was written, while the storage of data in the secondary storage system 320b during the method 400 is followed by the generation and transmission of a write completion communication that identifies a storage location in the primary storage system 320a to which that data will be subsequently moved. As such, one of skill in the art in possession of the present disclosure will appreciate how a host device generating the read I/O command directed to the primary storage system 320a will have provided a storage location in the primary storage system 320a in that read I/O command (i.e., the storage location where that host device was told that data was stored). Thus, at decision block 904, the storage emulation engine 306 may retrieve the storage location in the primary storage system 320a that is included in the read I/O command retrieved at block 902.

Figure 11:
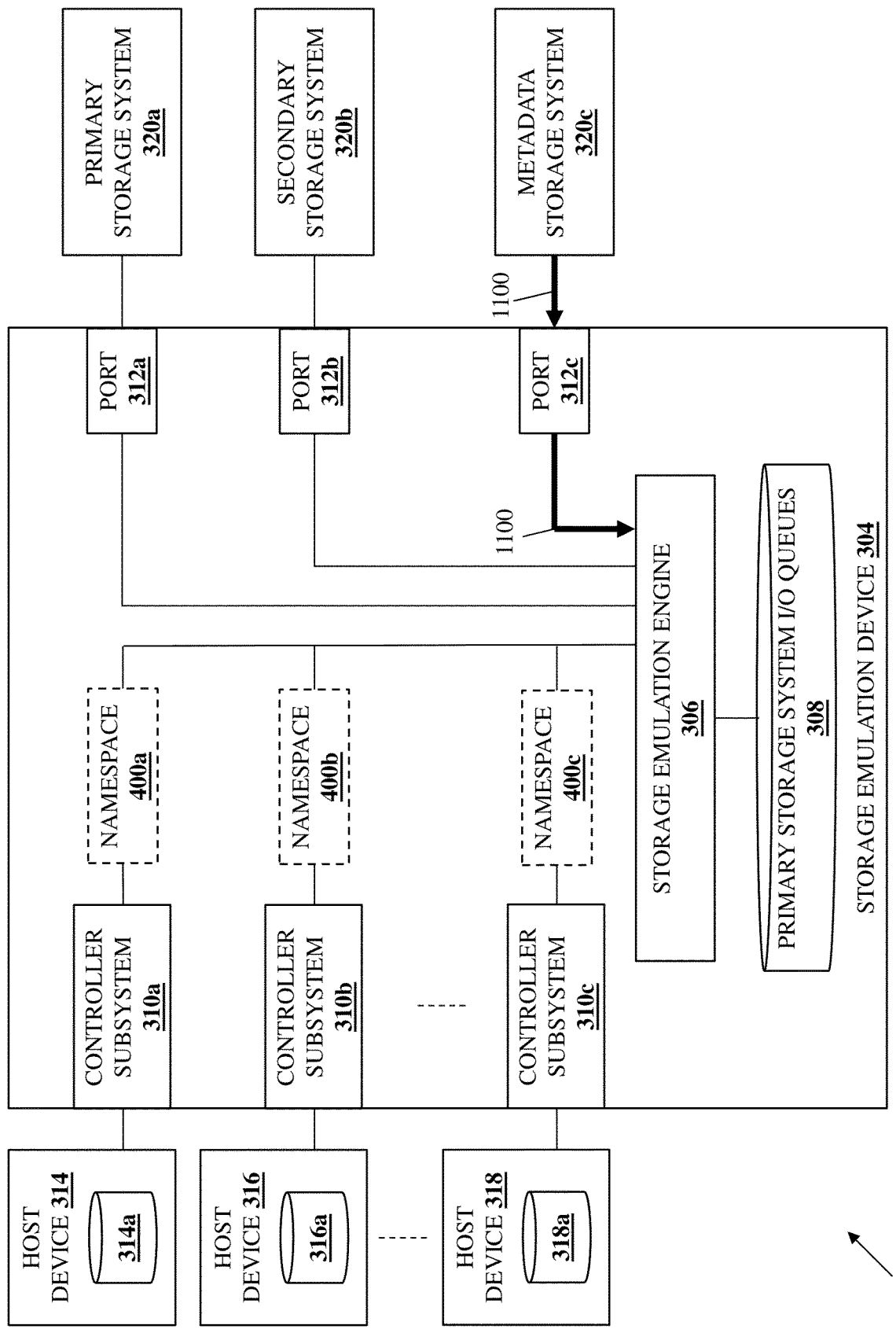
FIG. 11 is a schematic view illustrating an embodiment of the networked system of FIG. 3 operating during the method of FIG. 9.

With reference to FIG. 11, in some embodiments of decision block 904, the storage emulation engine 306 may perform mapping information retrieval operations 1100 that may include accessing the metadata storage system 320c via the port 312c and determining whether the storage location in the primary storage system 320a that is included in the read I/O command retrieved at block 902 is included in the metadata storage system 320c. As discussed above, when data in write I/O commands directed to the primary storage system 320a is stored in the secondary storage system 320b, mapping information may be provided in the metadata storage system 320c that associates the secondary storage system storage location in the secondary storage system 320b in which that data was stored, and the primary storage system storage location in the primary storage system 320a that is identified to the host device that provided that write I/O command. As such, a determination of whether the primary storage system storage location in the primary storage system 320a that is identified in the read I/O command retrieved at block 902 is included in the metadata storage system 320c is a determination of whether the data for that read I/O command is stored in the secondary storage system 320b.

However, while described as first checking the metadata storage system 320c to determine whether the primary storage system storage location in the primary storage system 320a identified in the read I/O command is included therein, one of skill in the art in possession of the present disclosure will appreciate how the storage emulation engine 306 may determine whether data identified in the read I/O command is stored in the secondary storage system 320b using other techniques that will fall within the scope of the present disclosure as well. For example, the storage emulation engine 306 may first use the primary storage system storage location in the primary storage system 320a identified in the read I/O command to attempt to retrieve the data from the primary storage system 320a (e.g., similarly as described below with reference to block 906), and may "determine" whether data identified in the read I/O command is stored in the secondary storage system 320b based on whether that data was retrieved from the primary storage system 320a (i.e., if the data is not retrieved from the primary storage system 320a, it will be "determined" that data is stored in the primary storage system 320a). However, one of skill in the art in possession of the present disclosure will appreciate how such operations may increase the I/O operations being performed with the primary storage system 320a, and thus may not be desirable to perform (at least in situations where it is known that a relatively high number of I/O operations are being performed with the primary storage system 320a).

In another example, when data directed to the primary storage system 320a is stored in the secondary storage system 320b as described above, the storage emulation engine 306 may mark the storage location in the primary storage system 320a that is identified to the host device for that data (i.e., the storage location in the primary storage system 320a to which that data will be subsequently moved) in its database. As such, the storage emulation engine 306 may check that database at decision block 904 to quickly determine whether data identified in the read I/O command is stored in the secondary storage system 320b, and as described below such primary storage system storage location marking may be utilized when data stored in the secondary storage system 320b is updated as well. However, while several specific examples have been provided, one of skill in the art in possession of the present disclosure will appreciate how the storage of data in the secondary storage system 320b may be identified in a variety of manners that will fall within the scope of the present disclosure as well.

Figure 12:
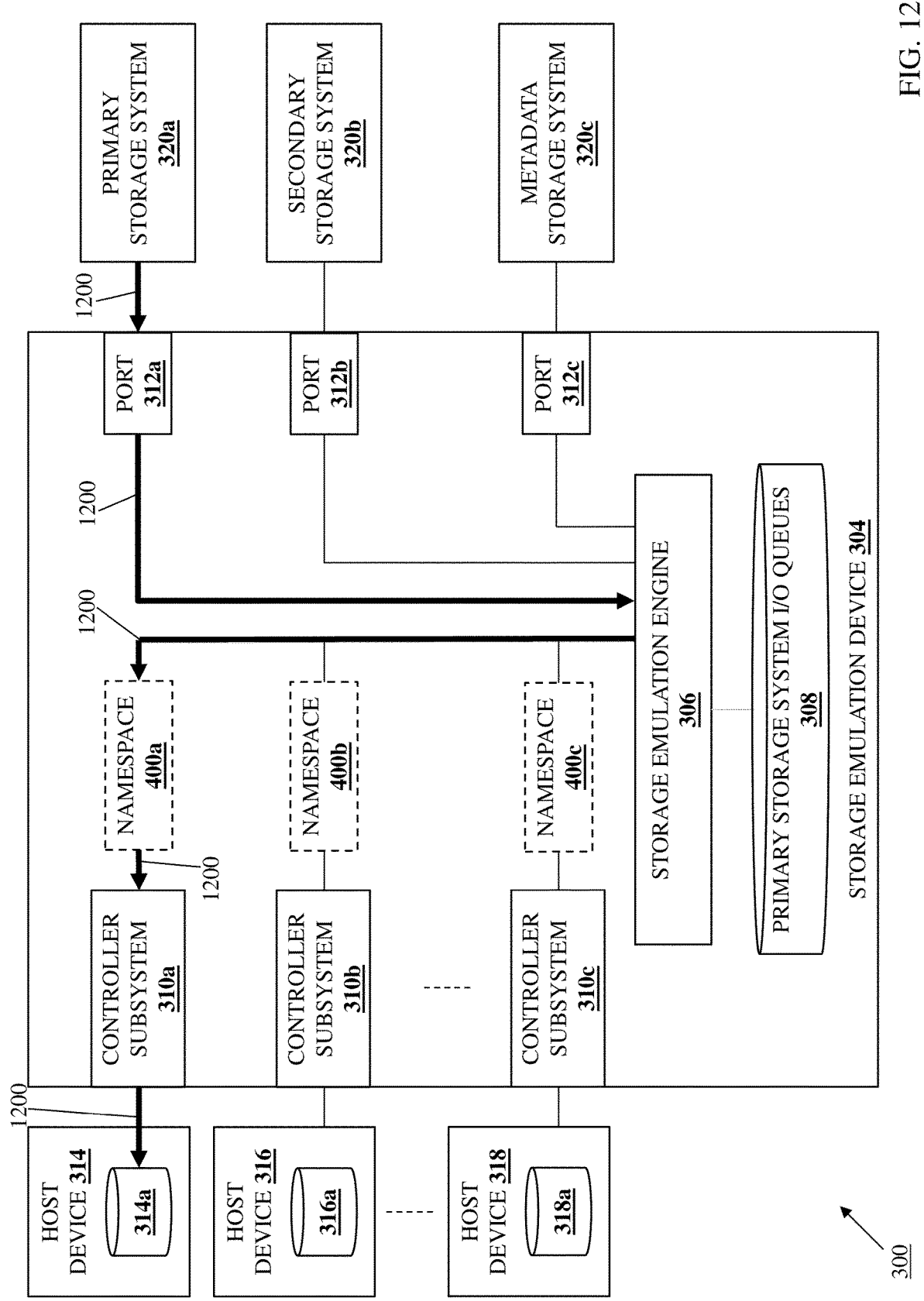
FIG. 12 is a schematic view illustrating an embodiment of the networked system of FIG. 3 operating during the method of FIG. 9.

If, at decision block 904, the data identified in the read I/O command is not stored in the secondary storage system, the method 900 proceeds to block 906 where the storage emulation subsystem executes the read I/O command to retrieve data from the primary storage system. With reference to FIG. 12, in an embodiment of block 906 and in response to determining that the primary storage system storage location identified in the read I/O command is not included in the metadata storage system 320c, the storage emulation engine 306 may perform read I/O command execution operations 1200 that may include retrieving data identified in the read I/O command (e.g., via the primary storage system storage location that was identified in read I/O command as described above) from the primary storage system 320a via the port 312a. In this example, the read I/O command retrieved at block 902 was provided by the host device 314, and the read I/O command execution operations 1200 include the storage emulation engine 306 transmitting the data retrieved from the primary storage system 320a to the controller subsystem 310a, the controller subsystem 310a providing that data in the host device I/O queue 314a and notifying the host device 314 of the I/O command (e.g., using an NVMe queue "doorbell"), and the host device 314 retrieving that data from its host device I/O queue 314a. However, while a specific example of the provisioning of read data to a host device has been described, one of skill in the art in possession of the present disclosure will appreciate how read data may be provided to host devices in a variety of manners that will fall within the scope of the present disclosure as well.

The method 900 then returns to block 902. As such, the method 900 may loop such that that storage emulation engine 306 retrieves read I/O commands and, if those read I/O commands identify data stored in the primary storage system 320a, the storage emulation engine 306 will execute those read I/O commands to retrieve that data from the primary storage system 320a.

Figure 13:
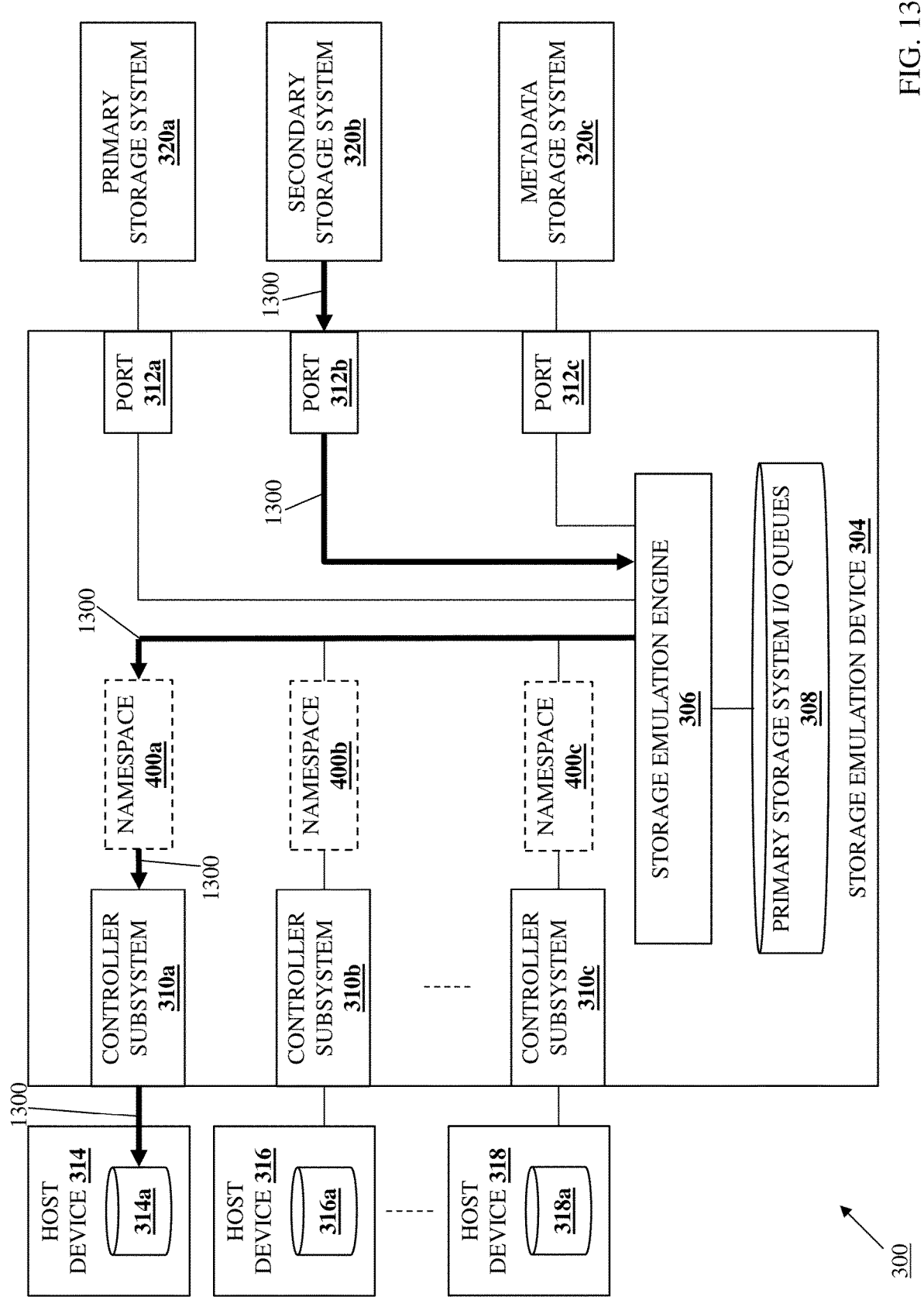
FIG. 13 is a schematic view illustrating an embodiment of the networked system of FIG. 3 operating during the method of FIG. 9.

If, at decision block 904, the data identified in the read I/O command is stored in the secondary storage system, the method 900 proceeds to block 908 where the storage emulation subsystem executes the read I/O command to retrieve data from the secondary storage system. With reference to FIG. 13, in an embodiment of block 908 and in response to determining that the primary storage system storage location identified in the read I/O command is included in the metadata storage system 320c, the storage emulation engine 306 may use the secondary storage system storage location that is associated in the metadata storage system 320c with the primary storage system storage location that was identified in read I/O command to perform read I/O command execution operations 1300 that may include retrieving data identified in the read I/O command from the secondary storage system 320b via the port 312b. In this example, the read I/O command retrieved at block 902 was provided by the host device 314, and the read I/O command execution operations 1300 include the storage emulation engine 306 transmitting the data retrieved from the secondary storage system 320b to the controller subsystem 310a, the controller subsystem 310a providing that data in the host device I/O queue 314a and notifying the host device 314 of the I/O command (e.g., using an NVMe queue "doorbell"), and the host device 314 retrieving that data from its host device I/O queue 314a. However, while a specific example of the provisioning of read data to a host device has been described, one of skill in the art in possession of the present disclosure will appreciate how read data may be provided to host devices in a variety of manners that will fall within the scope of the present disclosure as well.

The method 900 then returns to block 902. As such, the method 900 may loop such that that storage emulation engine 306 retrieves read I/O commands and, if those read I/O commands identify data stored in the secondary storage system 320b, the storage emulation engine 306 will execute those read I/O commands to retrieve that data from the secondary storage system 320b.

Figure 14:
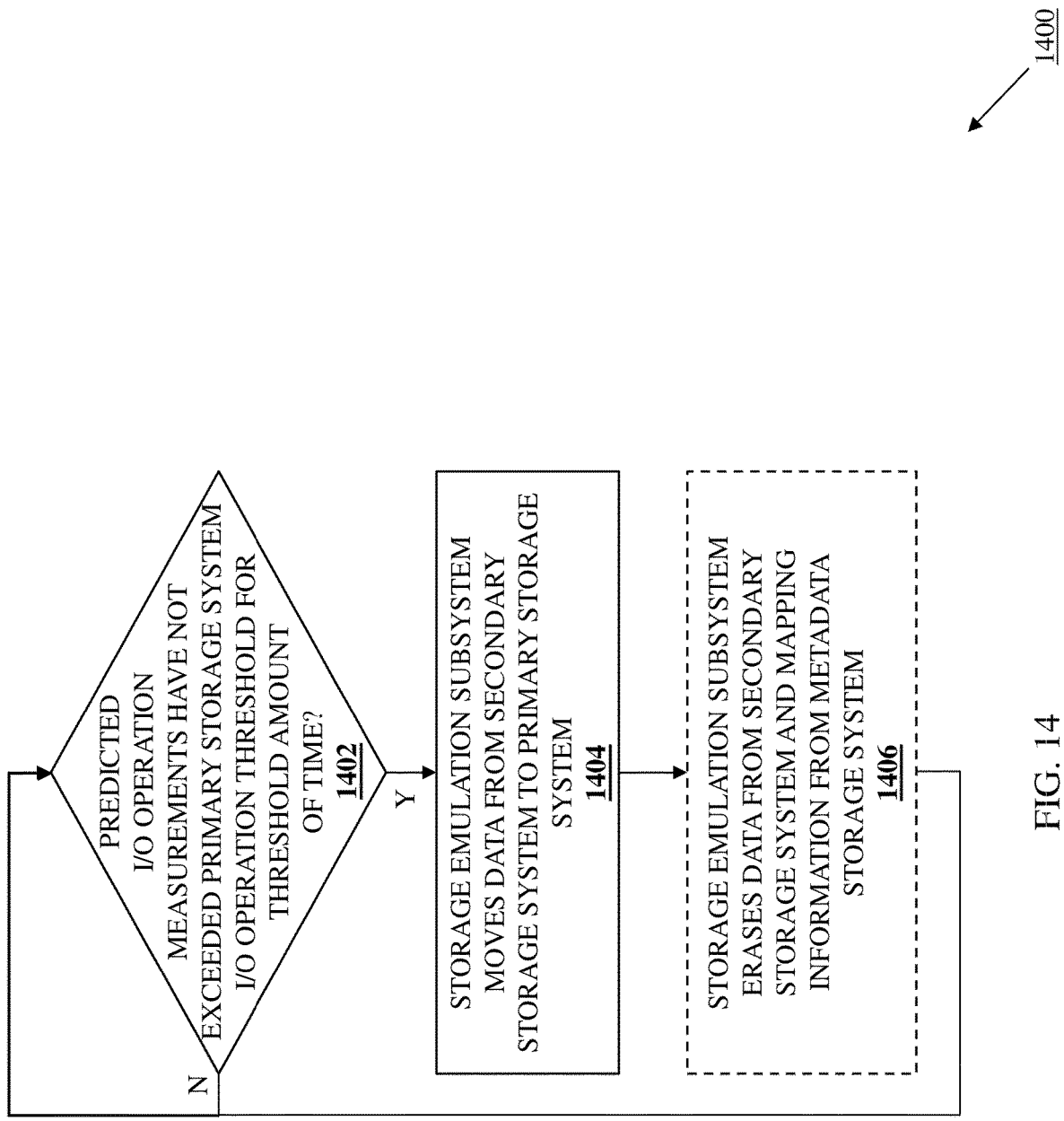
FIG. 14 is a flow chart illustrating an embodiment of a method for emulating a storage system based on inflight I/O commands.

As discussed above, the storage of data in the secondary storage system 320b from write I/O commands that are directed to the primary storage system 320a may be temporary, and data stored in the secondary storage system 320b may eventually be moved to the primary storage system 320a. Referring now to FIG. 14, an embodiment of a method 1400 for emulating a storage system based on inflight Input/Output (I/O) commands is illustrated. As discussed below, the data stored in the secondary storage system may be moved to the primary storage system when the performance of I/O operations using the primary storage system is below a desired latency.

The method 1400 begins at decision block 1402 where the method 1400 proceeds depending on whether the predicted I/O measurements have not exceeded the primary storage system I/O operation threshold for a threshold amount of time. In an embodiment, at decision block 1402 and during any iteration of the method 400, the storage emulation engine 306 may determine whether the predicted I/O operation measurements generated at block 406 for a plurality of performances of the method 400 has not exceeded the primary storage system I/O operation threshold for a threshold amount of time.

For example, during an iteration of the method 400, the storage emulation engine 306 may determine at decision block 408 that a predicted I/O operation measurement generated at block 406 exceeds the primary storage system I/O operation threshold, and may store data in the secondary storage system 320b similarly as described above. At some subsequent iteration of the method 400, the storage emulation engine 306 may determine at decision block 408 that a predicted I/O operation measurement generated at block 406 does not exceed the primary storage system I/O operation threshold and, in response, may store data in the primary storage system 320a similarly as described above. In addition, once the storage emulation engine 306 determines that a predicted I/O operation measurement does not exceed the primary storage system I/O operation threshold after the previously predicted I/O operation measurement did exceed the primary storage system I/O operation threshold, the storage emulation engine 306 may begin to track an amount of time in which one or more consecutive predicted I/O operation measurement(s) are generated that do not exceed the primary storage system I/O operation threshold.

For example, following the subsequent iteration of the method 400 discussed above in which the storage emulation engine 306 determines that the predicted I/O operation measurement does not exceed the primary storage system I/O operation threshold after the previously predicted I/O operation measurement did exceed the primary storage system I/O operation threshold, any consecutive subsequent performances of block 408 in further iterations of the method 400 in which the predicted I/O operation measurement does not exceed the primary storage system I/O operation threshold may be accompanied by the storage emulation engine 306 determine whether those predicted I/O operation measurements generated over those iterations of the method 400 have not exceeded the primary storage system I/O operation threshold for a threshold amount of time (e.g., whether a time elapsed between the first and last predicted I/O operation measurements exceeds the threshold amount of time). As such, one of skill in the art in possession of the present disclosure will appreciate how any predicted I/O operation measurement at block 408 of the method 400 that exceeds the primary storage system I/O operation threshold and that follows a previous iteration of the method 400 in which a predicted I/O operation measurement did not exceed the primary storage system I/O operation threshold may "reset the clock" for purposes of determining whether predicted I/O operation measurements have not exceeded the primary storage system I/O operation threshold for the threshold amount of time.

In an embodiment, the threshold amount of time may be an amount of time that is relatively likely to ensure that the resumed storage of data in the primary storage system 320a will not cause the primary storage system I/O operation threshold to be exceeded in some time frame (and result the resumed storage of data in the secondary storage system 320b), and one of skill in the art in possession of the present disclosure will appreciate how that amount of time may vary depending on the details of the networked system 300. In specific examples, the amount of time may be seconds (or portions thereof), minutes, and/or other time amounts that would be apparent to one of skill in the art in possession of the present disclosure. Furthermore, the threshold amount of time need not necessarily be measured in traditional time units (e.g., seconds), and instead may be measured in the number of consecutive predicted I/O operation measurements (or number of iterations of the method 400) performed subsequent to a "first" determination that a predicted I/O operation measurement did not exceed the primary storages system I/O operation threshold (i.e., following a determination that a predicted I/O operation measurement exceeded the primary storages system I/O operation threshold during an immediately previous iteration of the method 400). However, while specific examples have been provided, one of skill in the art in possession of the present disclosure will appreciate how the use of any of a variety of threshold amounts of "time" will fall within the scope of the present disclosure as well.

If, at decision block 1402, the predicted I/O measurement does not exceed the primary storage system I/O operation threshold for the threshold amount of time, the method 1400 returns to decision block 1402. As such, the method 1400 may loop such that the storage emulation engine 306 monitors the predicted I/O operation measurements across multiple iterations of the method 400 until a plurality of consecutive predicted I/O operations measurements are generated and do not exceed the primary storage system I/O operation threshold for the threshold amount of time.

Figure 15:
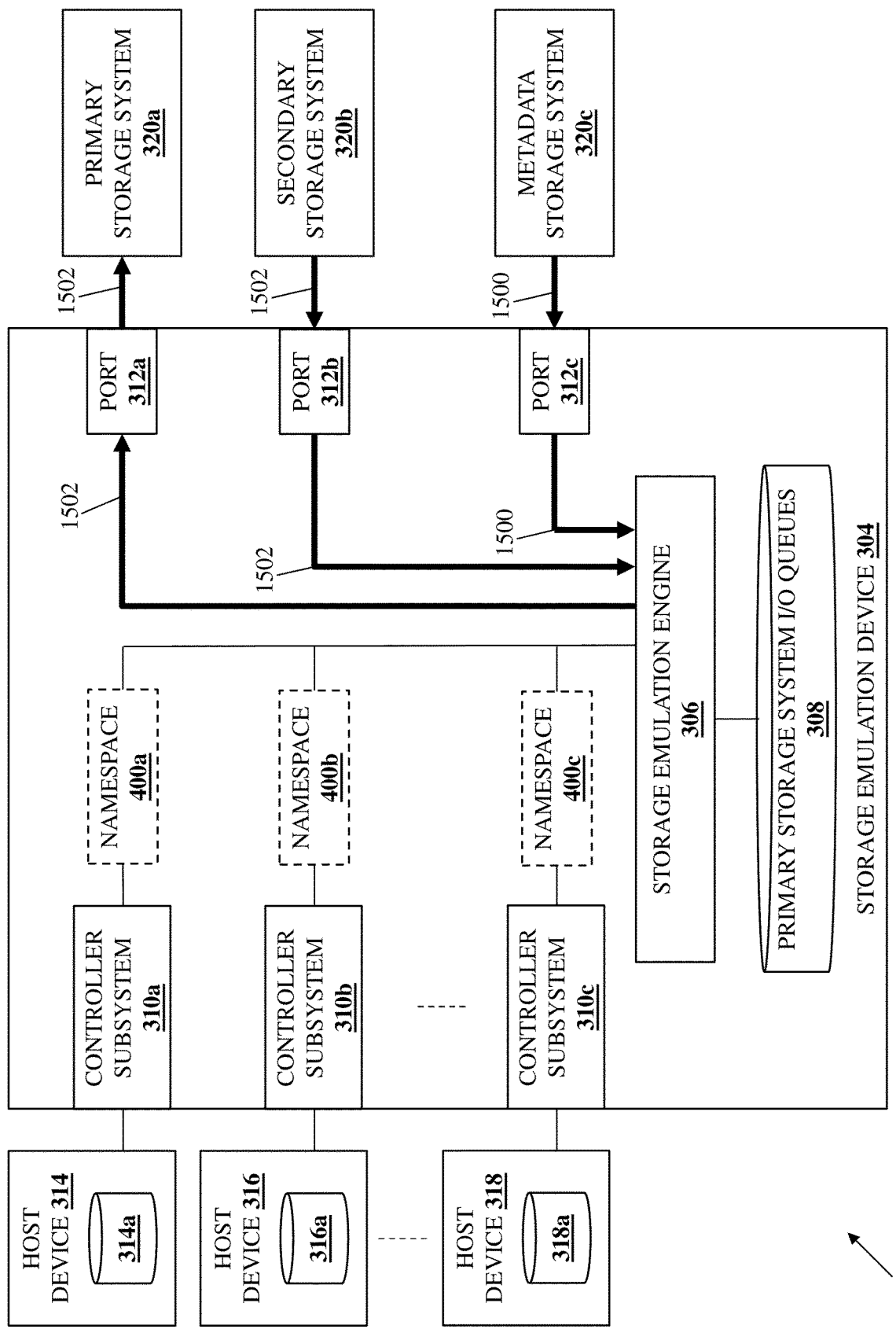
FIG. 15 is a schematic view illustrating an embodiment of the networked system of FIG. 3 operating during the method of FIG. 14.

If, at decision block 1402, the predicted I/O measurement exceeds the primary storage system I/O operation threshold for the threshold amount of time, the method 1400 proceeds to block 1404 where the storage emulation subsystem moves data from the secondary storage system to the primary storage system. With reference to FIG. 15, in an embodiment of block 1404 and in response to a plurality of consecutive predicted I/O operations measurements not exceeding the primary storage system I/O operation threshold for the threshold amount of time, the storage emulation engine 306 may perform mapping information retrieval operations 1500 that include retrieving the mapping information for the data stored in the secondary storage system 320b from the metadata storage system 320c via the port 312c.

The storage emulation engine 306 may then perform data movement operations 1502 that include retrieving the data that was stored in the secondary storage system 320b via the port 312b, and storing that data in the primary storage system 320a via the port 312a. As discussed above, the mapping information for the data stored in the secondary storage system 320b may associate the secondary storage system storage locations in the secondary storage system 320b in which data was stored at block 412 of the method 400 with respective primary storage system storage locations in the primary storage system 320a to which that data will be subsequently moved. As such, for each portion of data that is stored in the secondary storage system 320b, the data movement operations 1502 may include identifying the secondary storage system storage location in the mapping information for that portion of data, retrieving that portion of data from that secondary storage system storage location in the secondary storage system 320b, identifying the primary storage system storage location associated with that secondary storage system storage location in the mapping information, and storing that portion of data in that primary storage system storage location in the primary storage system 320a. However, while specific examples of the movement of data from the secondary storage system 320b to the primary storage system 320a have been described, one of skill in the art in possession of the present disclosure will appreciate how data may be moved from the secondary storage system 320b to the primary storage system 320a using a variety of techniques that will fall within the scope of the present disclosure as well.

Thus, any or all of the data that was stored in the secondary storage system 320b following the predicted I/O operation measurement first exceeding the primary storage system I/O operation threshold and up until the predicted I/O operation measurements did not exceed the primary storage system I/O operation threshold may be moved from the secondary storage system 320b to the primary storage system 320a by the storage emulation device 304 and without involvement of the host devices 314-318.

Figure 16:
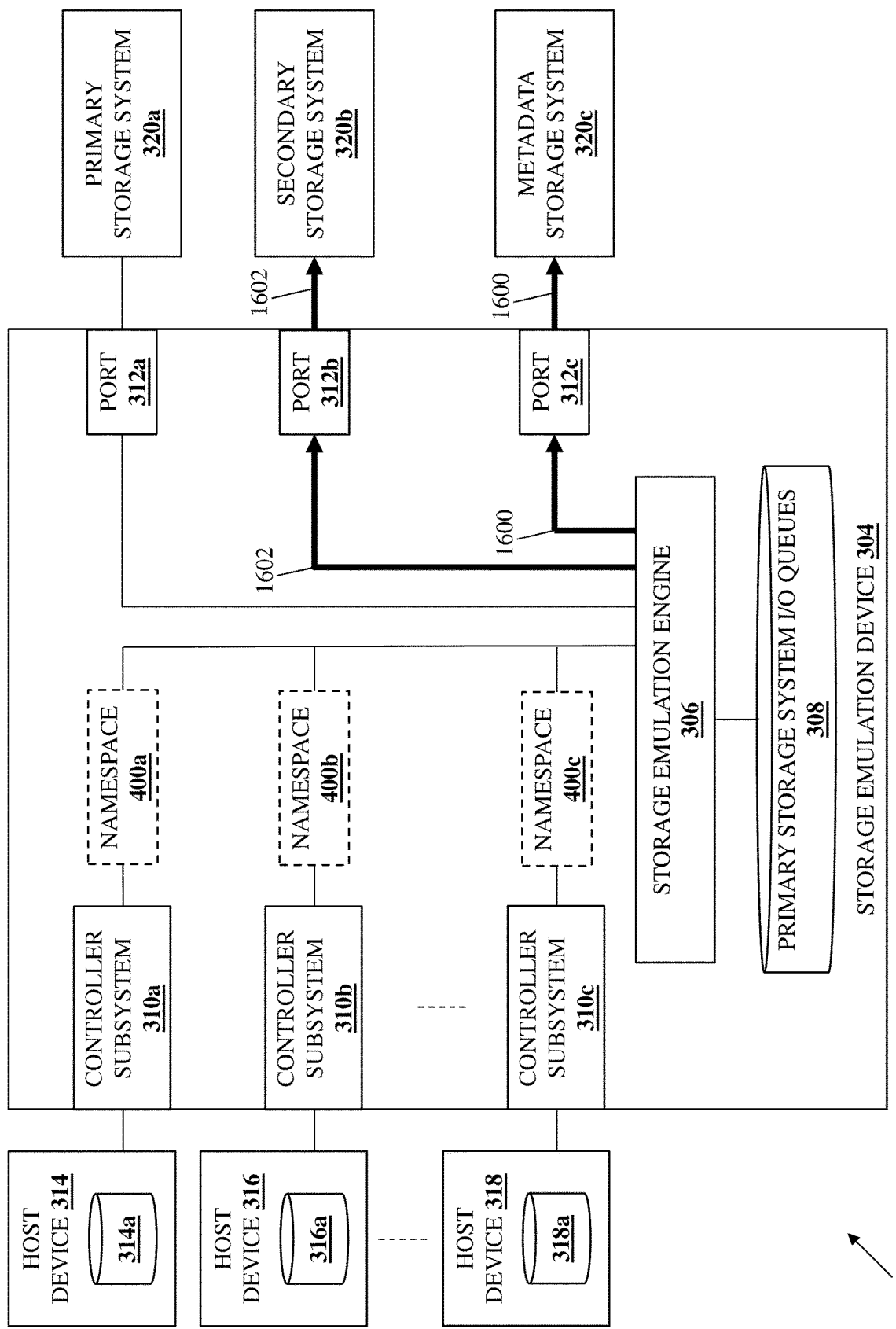
FIG. 16 is a schematic view illustrating an embodiment of the networked system of FIG. 3 operating during the method of FIG. 14.

The method 1400 may then proceeds to optional block 1406 where the storage emulation subsystem may erase the data from the secondary storage system and the mapping information from the metadata storage system. As will be appreciated by one of skill in the art in possession of the present disclosure, optional block 1406 may be performed when block 1404 provides for the movement of any or all of the data that was stored in the secondary storage system 320b during the method 400 to the primary storage system 320a during the method 1400. As such, with reference to FIG. 16 and in an embodiment of optional block 1406, the storage emulation engine 306 may perform mapping information erasing operations 1600 that include erasing the mapping information from the metadata storage system 320c via the port 312c, and data erasing operations 1602 that include erasing the data from the secondary storage system 320b via the port 312b (e.g., the data that was moved from the secondary storage system 320b to the primary storage system 320a, and its associated mapping information). As will be appreciated by one of skill in the art in possession of the present disclosure, optional block 1406 provides for the freeing up of space in the secondary storage system 320b and the metadata storage system 320c when the data and mapping information, respectively, stored therein is no longer needed (i.e., because that data has been moved to the primary storage system 320a).

However, while optional block 1406 is described above as providing for the erasure of data from the metadata storage system 320c, one of skill in the art in possession of the present disclosure will appreciate how the data stored in the metadata storage system 320c may be managed in other manners as well. For example, in the event the predicted I/O operation measurements no longer exceed the primary storage system I/O operation threshold at decision block 408, write I/O commands that provide for the updating of data that was most recently stored in the secondary storage system 320b may executed in the primary storage system 320a in order to provide the most current version of that data in the primary storage system 320a, and the related data in the metadata storage system 320c may be erased. As will be appreciated by one of skill in the art in possession of the present disclosure, such operation ensure that the most current data is stored in the primary storage system 320a and not in the secondary storage system 320b, and the erasure of the related data from the metadata storage system 320c prevents the returning of "stale" data (i.e., a non-current version of requested data) from the secondary storage system 320b, or the copying of data from the secondary storage system 320b to the primary storage system 320a when there is already an inflight I/O command to update that data in the primary storage system 320a.

The method 1400 then returns to decision block 1402. As such, the method 1400 may loop such that the storage emulation engine 306 moves data stored in secondary storage systems to their corresponding primary storage systems when the predicted I/O operation measurements for their primary storage systems have not exceeded the primary storage system I/O operation threshold for their primary storage systems for the threshold amount of time, and erases data and mapping information from those secondary storage systems and their corresponding metadata storage systems when any or all of the data stored in those secondary storage systems is moved to their corresponding primary storage systems.

Figure 17:
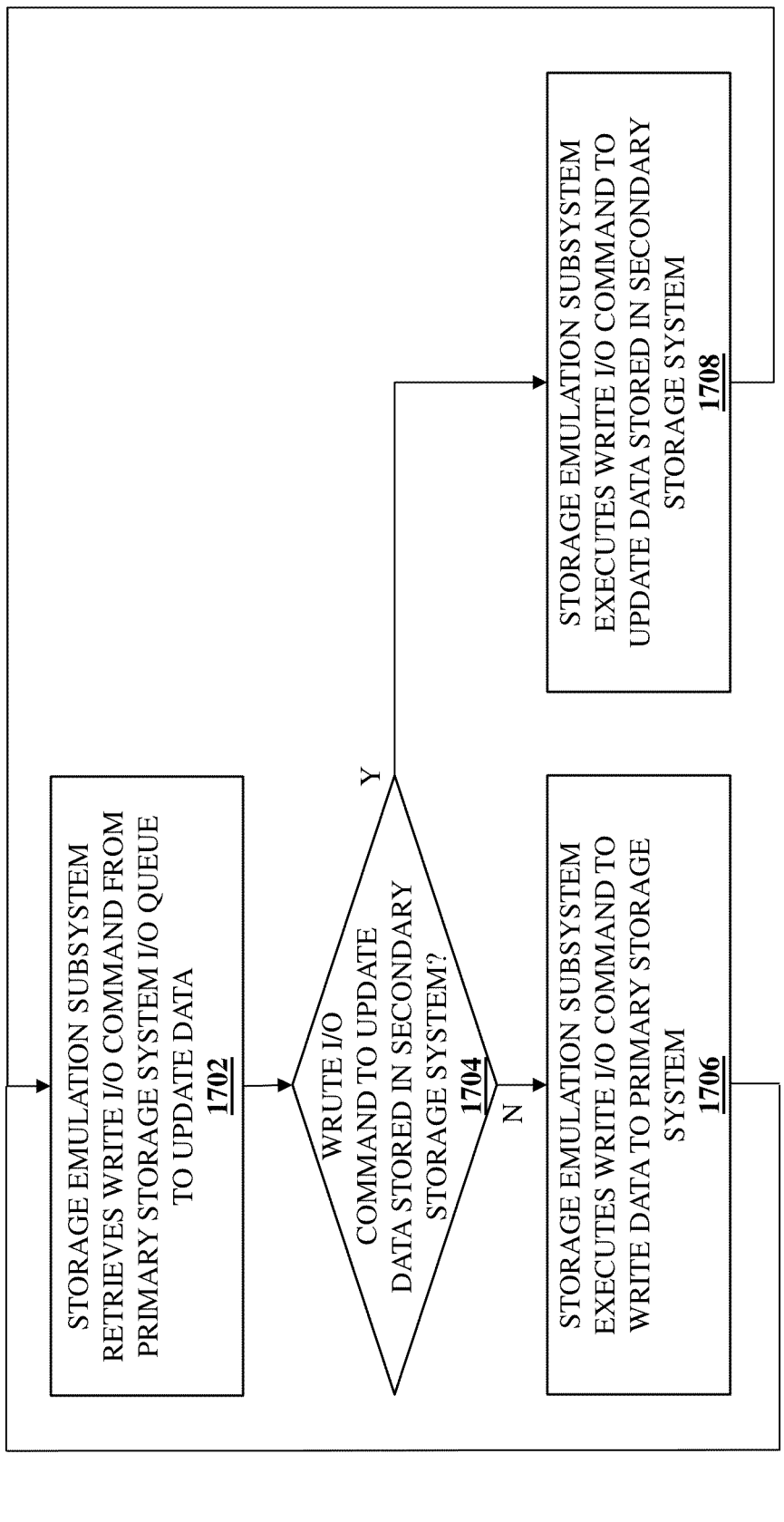
FIG. 17 is a flow chart illustrating an embodiment of a method for emulating a storage system based on inflight I/O commands.
Figure 18:
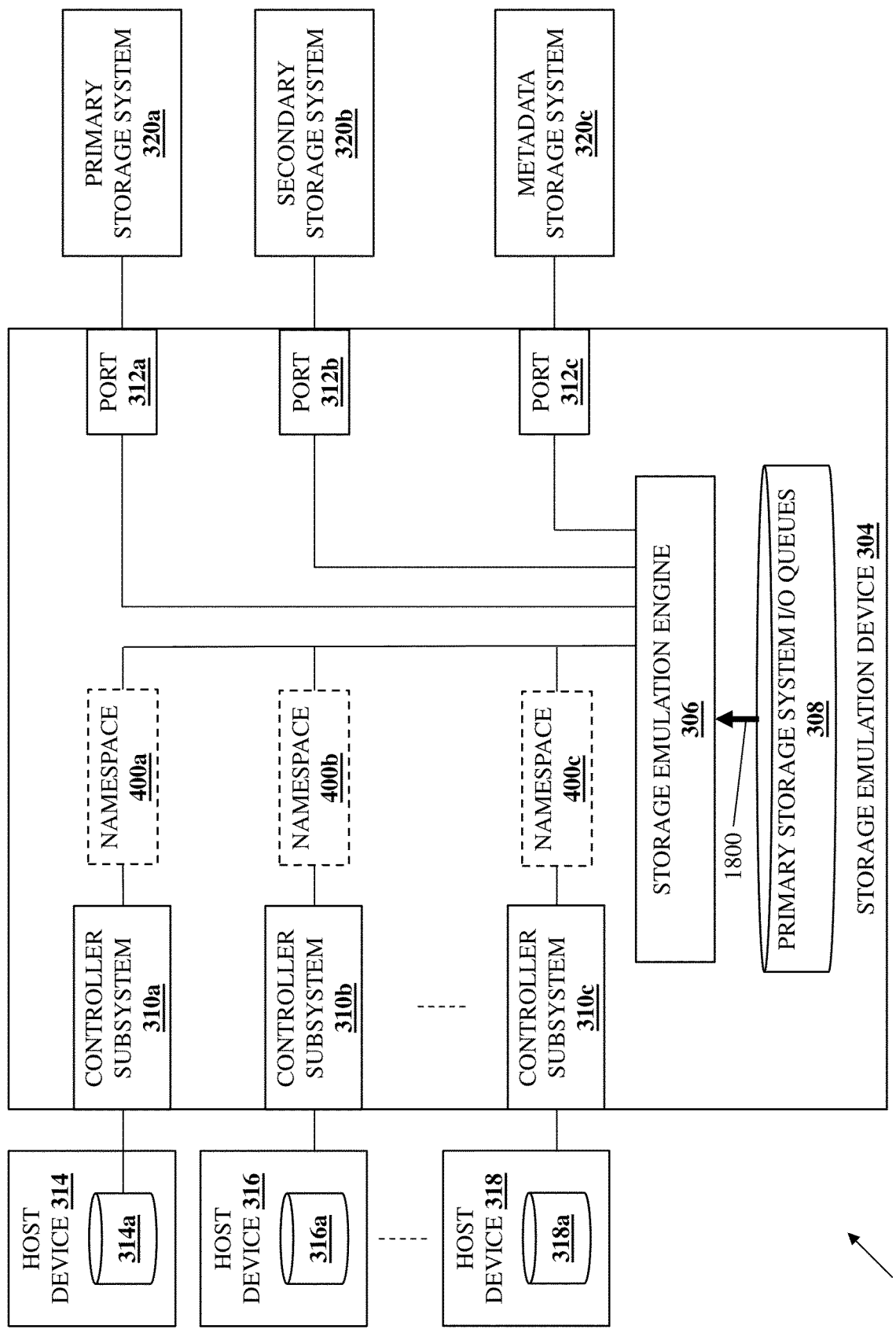
FIG. 18 is a schematic view illustrating an embodiment of the networked system of FIG. 3 operating during the method of FIG. 17.

Referring now to FIG. 17, an embodiment of a method 1700 for emulating a storage system based on inflight Input/Output (I/O) commands is illustrated. As discussed below, the systems and methods of the present disclosure provide for the identification that a write I/O command updates data that was provided for storage in a primary storage system but that was stored in a secondary storage system and, in response, executes that write I/O command to update that data in the secondary storage system. As such, data in write I/O commands directed to a primary storage system may be temporarily stored and updated in a secondary storage system while it remains stored in that secondary storage system.

The method 1700 begins at block 1702 where the storage emulation subsystem retrieves write I/O commands from the primary storage system queue to update data. In an embodiment, at block 1702, the storage emulation engine 306 may perform write I/O command data update retrieval operations 1800 that may include retrieving a write I/O command that provides for an update of data from the primary storage system I/O queues 308 for the primary storage system 320a. As will be appreciated by one of skill in the art in possession of the present disclosure, the write I/O command may have been received and stored in the primary storage system I/O queues 308 for the primary storage system 320a at block 404 of the method 400 following its generation and transmission by any of the host devices 314-318 at block 402 of the method 400 similarly as described above.

The method 1700 then proceeds to decision block 1704 where the method proceeds depending on whether the write I/O command updates data that is stored in the secondary storage system. As discussed above, the storage of data in the primary storage system 320a during the method 400 is followed by the generation and transmission of a write completion communication that identifies a storage location in the primary storage system 320a to which that data was written, while the storage of data in the secondary storage system 320b during the method 400 is followed by the generation and transmission of a write completion communication that identifies a storage location in the primary storage system 320a to which that data will be subsequently moved. As such, one of skill in the art in possession of the present disclosure will appreciate how a host device generating the write I/O command directed to updating data in the primary storage system 320a will have provided a storage location in the primary storage system 320a in that write I/O command (i.e., the storage location where that host device was told that the data being updated was stored). Thus, at decision block 1704, the storage emulation engine 306 may retrieve the storage location in the primary storage system 320a that is included in the write I/O command retrieved at block 1702.

Figure 19:
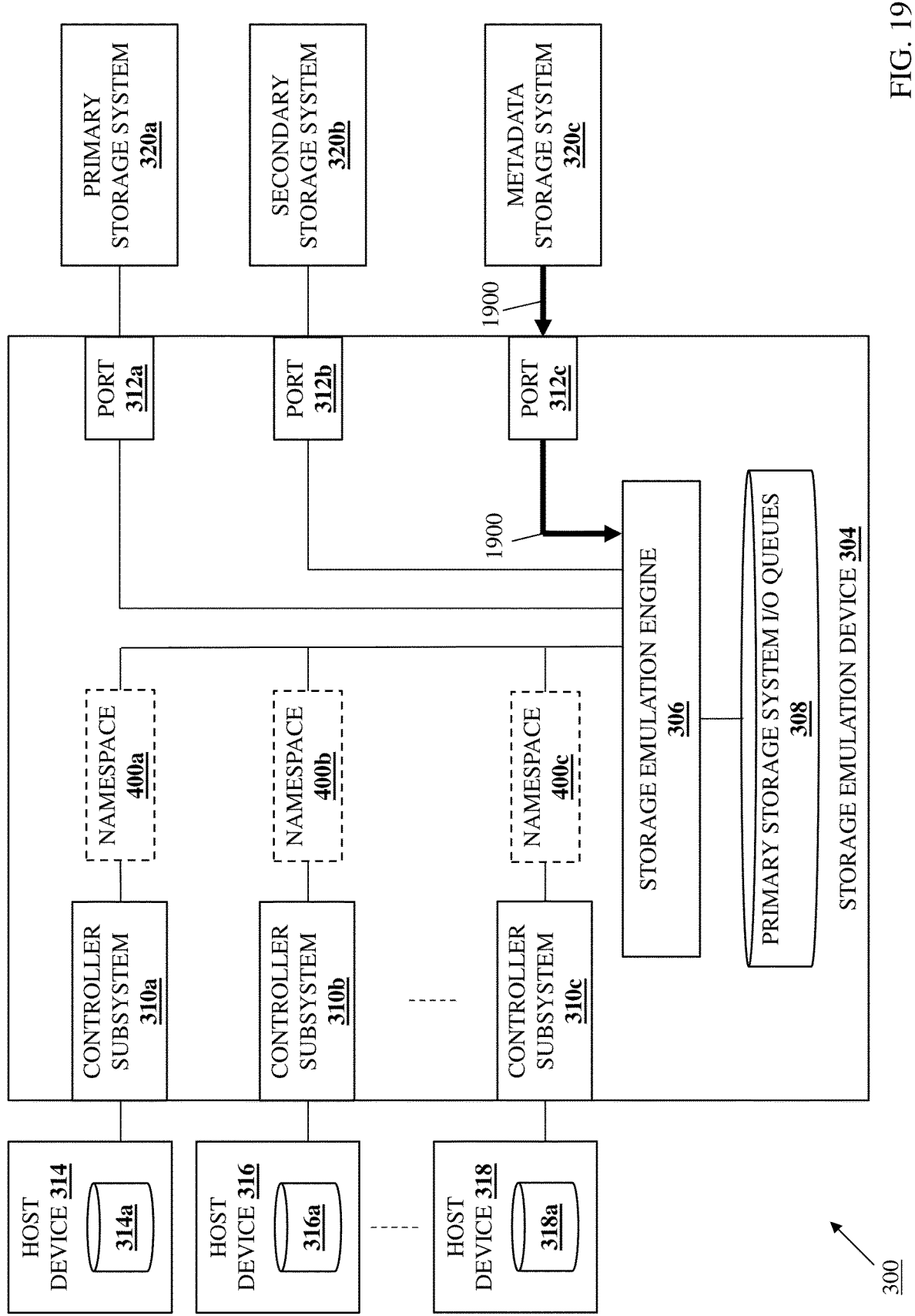
FIG. 19 is a schematic view illustrating an embodiment of the networked system of FIG. 3 operating during the method of FIG. 14.

With reference to FIG. 19, in some embodiments of decision block 1704, the storage emulation engine 306 may perform mapping information retrieval operations 1900 that may include accessing the metadata storage system 320c via the port 312c and determining whether the storage location in the primary storage system 320a that is included in the write I/O command retrieved at block 1702 is included in the metadata storage system 320c. As discussed above, when data in write I/O commands directed to the primary storage system 320a is stored in the secondary storage system 320b, mapping information may be provided in the metadata storage system 320c that associates the secondary storage system storage location in the secondary storage system 320b in which that data was stored, and the primary storage system storage location in the primary storage system 320a that is identified to the host device that provided that write I/O command. As such, a determination of whether the primary storage system storage location in the primary storage system 320a that is identified in the write I/O command retrieved at block 1702 is included in the metadata storage system 320c is a determination of whether the data being updated via that write I/O command is stored in the secondary storage system 320b.

However, while described as first checking the metadata storage system 320c to determine whether the primary storage system storage location in the primary storage system 320a identified in the write I/O command is included therein, one of skill in the art in possession of the present disclosure will appreciate how the storage emulation engine 306 may determine whether data identified in the write I/O command updates data stored in the secondary storage system 320b using other techniques that will fall within the scope of the present disclosure as well. For example, the storage emulation engine 306 may first use the primary storage system storage location in the primary storage system 320a identified in the write I/O command to attempt to update the data in the primary storage system 320a (e.g., similarly as described below with reference to block 1706), and may "determine" whether data identified in the write I/O command is stored in the secondary storage system 320b based on whether that data was updated in the primary storage system 320a (i.e., if the data is not updated from the primary storage system 320a, it will be "determined" that data is stored in the primary storage system 320a). However, one of skill in the art in possession of the present disclosure will appreciate how such operations may increase the I/O operations being performed with the primary storage system 320a, and thus may not be desirable to perform (at least in situations where it is known that a relatively high number of I/O operations are being performed with the primary storage system 320a).

In another example, and as discussed above, when data directed to the primary storage system 320a is stored in the secondary storage system 320b the storage emulation engine 306 may mark the storage location in the primary storage system 320a that is identified to the host device for that data (i.e., the storage location in the primary storage system 320a to which that data will be subsequently moved) in its database. As such, the storage emulation engine 306 may check that database at decision block 1704 to quickly determine whether data identified in the write I/O command updates data that is stored in the secondary storage system 320b. However, while several specific examples have been provided, one of skill in the art in possession of the present disclosure will appreciate how the storage of data in the secondary storage system 320b may be identified in a variety of manners that will fall within the scope of the present disclosure as well.

Figure 20:
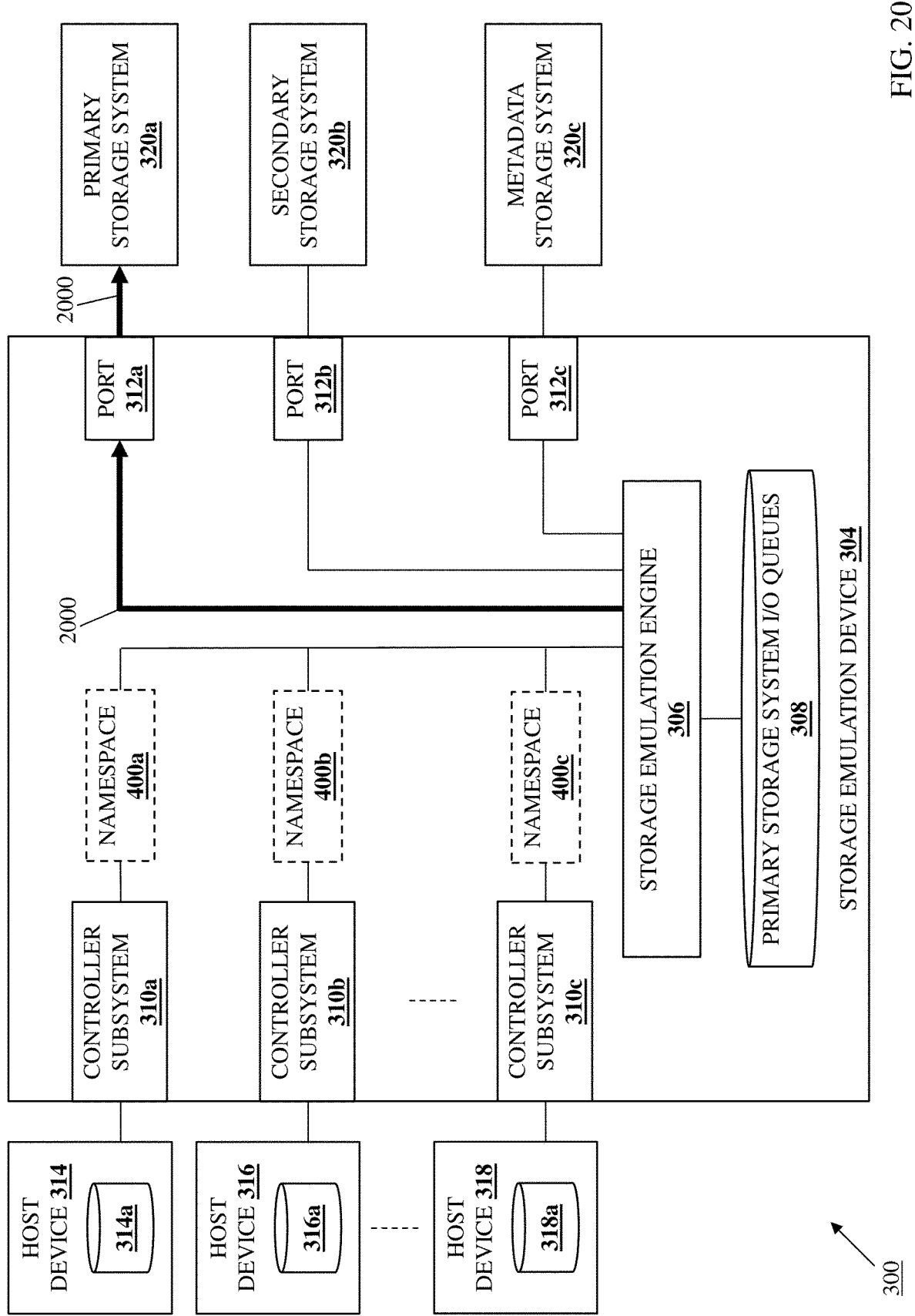
FIG. 20 is a schematic view illustrating an embodiment of the networked system of FIG. 3 operating during the method of FIG. 14.

If, at decision block 1704, the write I/O command does not update data that is stored in the secondary storage system, the method 700 proceeds to block 1706 where the storage emulation subsystem executes the write I/O command to update data in the primary storage system. With reference to FIG. 20, in an embodiment of block 1706 and in response to write I/O command not updating data that is stored in the secondary storage system at decision block 1706, the storage emulation engine 306 may perform write I/O command execution operations 2000 that may include executing the write I/O command retrieved at block 1702 via the port 312a and with the primary storage system 320a in order to update data in the primary storage system 320a with data provided in that I/O write command.

While not illustrated, one of skill in the art in possession of the present disclosure will appreciate how the storage emulation engine 306 may follow the updating of the data in the primary storage system 320a by generating and transmitting a write completion communication to the host device that provided the I/O command that included that data, with that write completion communication identifying the primary storage system storage location of that data in the primary storage system 320a (e.g., one or more LBAs associated with the physical storage location of that data in the primary storage system 320a). The method 1700 then returns to block 1702. As such, the method 1700 may loop such that the storage emulation engine 306 retrieves write I/O commands that update data at block 1702 and, as long those write I/O commands do not update data stored in the secondary storage system 320b, the storage emulation engine 306 executes write I/O commands to update data in the primary data storage system 320a.

Figure 21:
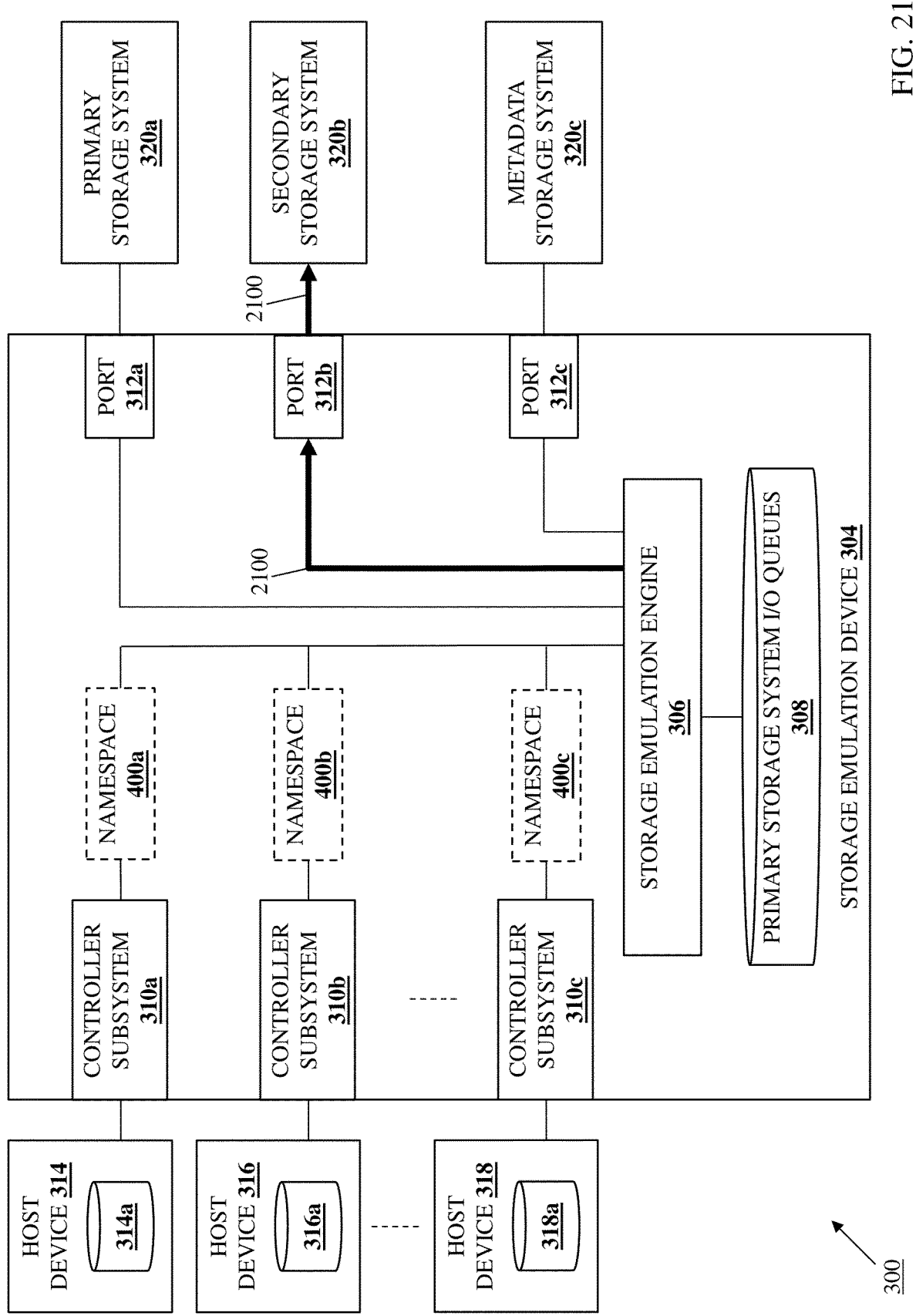
FIG. 21 is a schematic view illustrating an embodiment of the networked system of FIG. 3 operating during the method of FIG. 14.

If, at decision block 1704, the write I/O command updates data that is stored in the secondary storage system, the method 400 proceeds to block 1708 where the storage emulation subsystem executes the write I/O command to update data in the secondary storage system. With reference to FIG. 21, in an embodiment of block 1708 and in response to write I/O command updating data that is stored in the secondary storage system 320b at decision block 1704, the storage emulation engine 306 may perform write I/O command execution operations 2100 that may include executing the write I/O command retrieved at block 1702 via the port 312b and with the secondary storage system 320b in order to update data in the secondary storage system 320b with data provided in that I/O write command. As will be appreciated by one of skill in the art in possession of the present disclosure, the updating of the data in the secondary storage system 320b may include using data in the write I/O command to update data stored in a secondary storage system storage location in the secondary storage system 320b (e.g., updating data stored in one or more LBAs associated with physical storage locations in the secondary storage system 320b). While not illustrated, following the updating of the data in the secondary storage system 320a, the storage emulation engine 306 may generate and transmit a write completion communication to the host device that provided the write I/O command similarly as described above.

The method 1700 then returns to block 1702. As such, the method 1700 may loop such that the storage emulation engine 306 retrieves write I/O commands that update data at block 1702 and, whenever those write I/O commands update data stored in the secondary storage system 320*b*, the storage emulation engine 306 executes those write I/O commands to update that data in the secondary data storage system 320*a* until that data is moved to the primary storage system 320*a* as described above with regard to the method 1400.

Thus, systems and methods have been described that provide for the monitoring of inflight I/O commands for a primary storage system to determine whether to execute write I/O commands to store data in that primary storage system, or to store data temporarily in a secondary storage system before copying it to the primary storage system. For example, the inflight-I/O-based storage emulation system of the present disclosure may include a storage emulation device coupled to host devices, and to storage devices that provide primary, secondary, and metadata storage systems. The storage emulation device stores I/O commands directed to the primary storage system by the host devices in its I/O queue. If the storage emulation device predicts I/O operations for I/O commands in its I/O queue do not exceed a threshold, it executes at least some of those I/O commands to store first data in the primary storage system. If the storage emulation device predicts I/O operations for I/O commands in its I/O queue exceed the threshold, it executes at least some of those I/O commands to store second data in the secondary storage system, and provides mapping information in the metadata storage system that identifies storage location(s) in the primary storage system associated with the second data in the secondary storage system. As such, I/O command execution and/or I/O operation delays for the primary storage system and associated host device data operation delays caused by primary storage system I/O operation bottlenecks are eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An inflight-Input/Output (I/O)-based storage emulation system, comprising:
   a plurality of host devices;
   a plurality of storage devices that provide a first primary storage system, a first secondary storage system, and a first metadata storage system; and
   a storage emulation device coupled to each of the plurality of host devices and the plurality of storage devices, wherein the storage emulation device is configured to:
      store Input/Output (I/O) commands, which were generated by at least some of the plurality of host devices and that are directed to the first primary storage system, in a first primary storage system I/O queue;
      determine, during a first time period, that a first predicted I/O operation measurement that is based on first I/O commands stored in the first primary storage system I/O queue does not exceed a first primary storage system I/O operation threshold and, in response:
         execute at least some of the first I/O commands stored in the first primary storage system I/O queue to store first data in the first primary storage system;
      determine, during a second time period that is subsequent to the first time period, that a second predicted I/O operation measurement that is based on second I/O commands stored in the first primary storage system I/O queue exceeds the first primary storage system I/O operation threshold and, in response:
         execute at least some of the second I/O commands stored in the first primary storage system I/O queue to store second data in the first secondary storage system; and
         provide, in the first metadata storage system, second data mapping information that identifies at least one storage location in the first primary storage system associated with the second data stored in the first secondary storage system.

2. The system of claim 1, wherein the storage emulation device is configured to:
   determine, during a third time period that is subsequent to the second time period, that a third predicted I/O operation measurement that is based on third I/O commands stored in the first primary storage system I/O queue does not exceed the first primary storage system I/O operation threshold and, in response:
      move, using the second data mapping information in the first metadata storage system, the second data from the first secondary storage system to the at least one storage location in the first primary storage system.

3. The system of claim 2, wherein the storage emulation device is configured to:
   erase, in response to moving the second data from the first secondary storage system to the at least one storage location in the first primary storage system, the second data from the first secondary storage system and the second data mapping information from the first metadata storage system.

4. The system of claim 1, wherein the storage emulation device is configured to:
   execute, during a third time period that is subsequent to the second time period, at least one read I/O command that was received from at least one of the plurality of host devices and that identifies the second data using the at least one storage location in the first primary storage system;
   retrieve, from the first secondary storage subsystem using the second data mapping information in the first metadata storage system, the second data; and
   transmit, to the at least one of the plurality of host devices, the second data.

5. The system of claim 1, wherein the plurality of storage devices provide a second primary storage system, a second secondary storage system, and a second metadata storage system, and wherein the storage emulation device is configured to:
   store I/O commands, which were generated by at least some of the plurality of host devices and that are directed to the second primary storage system, in a second primary storage system I/O queue;
   determine, during a third time period, that a third predicted I/O operation measurement that is based on third I/O commands stored in the second primary storage system I/O queue does not exceed a second primary storage system I/O operation threshold and, in response:
      execute at least some of the third I/O commands stored in the second primary storage system I/O queue to store third data in the second primary storage system;
   determine, during a fourth time period that is subsequent to the third time period, that a fourth predicted I/O operation measurement that is based on fourth I/O commands stored in the second primary storage system I/O queue exceeds the second primary storage system I/O operation threshold and, in response:
    execute at least some of the fourth I/O commands stored in the second primary storage system I/O queue to store fourth data in the second secondary storage system; and
    provide, in the second metadata storage system, fourth data mapping information that identifies at least one storage location in the second primary storage system associated with the fourth data stored in the second secondary storage system.

6. The system of claim 1, wherein the storage emulation device is configured to:
    provide, in response to executing the at least some second I/O commands to store the second data in the first secondary storage system, a respective data storage confirmation that identifies a respective storage location for each portion of the second data to the host device that provided that portion of the second data.

7. An Information Handling System (IHS), comprising:
a processing system; and
a memory system that is coupled to the processing system and that includes instructions that, when executed by the processing system, cause the processing system to provide a storage emulation engine that is configured to:
    store Input/Output (I/O) commands, which were generated by at least some of a plurality of host devices and that are directed to a first primary storage system that is provided by one or more of a plurality of storage devices that are coupled to the processing system, in a first primary storage system I/O queue;
    determine, during a first time period, that a first predicted I/O operation measurement that is based on first I/O commands stored in the first primary storage system I/O queue does not exceed a first primary storage system I/O operation threshold and, in response:
        execute at least some of the first I/O commands stored in the first primary storage system I/O queue to store first data in the first primary storage system;
    determine, during a second time period that is subsequent to the first time period, that a second predicted I/O operation measurement that is based on second I/O commands stored in the first primary storage system I/O queue exceeds the first primary storage system I/O operation threshold and, in response:
        execute at least some of the second I/O commands stored in the first primary storage system I/O queue to store second data in a first secondary storage system that is provided by the one or more of the plurality of storage devices; and
        provide, in the first metadata storage system that is provided by the one or more of the plurality of storage devices, second data mapping information that identifies at least one storage location in the first primary storage system associated with the second data stored in the first secondary storage system.

8. The IHS of claim 7, wherein the storage emulation engine is configured to:
    determine, during a third time period that is subsequent to the second time period, that a third predicted I/O operation measurement that is based on third I/O commands stored in the first primary storage system I/O queue does not exceed the first primary storage system I/O operation threshold and, in response:
        move, using the second data mapping information in the first metadata storage system, the second data from the first secondary storage system to the at least one storage location in the first primary storage system.

9. The IHS of claim 8, wherein the storage emulation engine is configured to:
    erase, in response to moving the second data from the first secondary storage system to the at least one storage location in the first primary storage system, the second data from the first secondary storage system and the second data mapping information from the first metadata storage system.

10. The IHS of claim 7, wherein the storage emulation engine is configured to:
    execute, during a third time period that is subsequent to the second time period, at least one read I/O command that was received from at least one of the plurality of host devices and that identifies the second data using the at least one storage location in the first primary storage system;
    retrieve, from the first secondary storage subsystem using the second data mapping information in the first metadata storage system, the second data; and
    transmit, to the at least one of the plurality of host devices, the second data.

11. The IHS of claim 7, wherein the storage emulation engine is configured to:
    store I/O commands, which were generated by at least some of the plurality of host devices and that are directed to a second primary storage system that is provided by the one or more of the plurality of storage devices, in a second primary storage system I/O queue;
    determine, during a third time period, that a third predicted I/O operation measurement that is based on third I/O commands stored in the second primary storage system I/O queue does not exceed a second primary storage system I/O operation threshold and, in response:
        execute at least some of the third I/O commands stored in the second primary storage system I/O queue to store third data in the second primary storage system;
    determine, during a fourth time period that is subsequent to the third time period, that a fourth predicted I/O operation measurement that is based on fourth I/O commands stored in the second primary storage system I/O queue exceeds the second primary storage system I/O operation threshold and, in response:
        execute at least some of the fourth I/O commands stored in the second primary storage system I/O queue to store fourth data in a second secondary storage system that is provided by the one or more of the plurality of storage devices; and
        provide, in a second metadata storage system that is provided by the one or more of the plurality of storage devices, fourth data mapping information that identifies at least one storage location in the second primary storage system associated with the fourth data stored in the second secondary storage system.

12. The IHS of claim 7, wherein the storage emulation engine is configured to:
    provide, in response to executing the at least some second I/O commands to store the second data in the first secondary storage system, a respective data storage confirmation that identifies a respective storage location for each portion of the second data to the host device that provided that portion of the second data.

13. The IHS of claim 7, wherein the first secondary storage system and the first metadata storage system are provided by the same one or more of the plurality of storage devices.

14. A method for emulating a storage system based on inflight Input/Output (I/O) commands, comprising:
storing, by a storage emulation subsystem, Input/Output (I/O) commands, which were generated by at least some of a plurality of host devices and that are directed to a first primary storage system that is provided by one or more of a plurality of storage devices, in a first primary storage system I/O queue;
determining, by the storage emulation subsystem during a first time period, that a first predicted I/O operation measurement that is based on first I/O commands stored in the first primary storage system I/O queue does not exceed a first primary storage system I/O operation threshold and, in response:
executing, by the storage emulation subsystem, at least some of the first I/O commands stored in the first primary storage system I/O queue to store first data in the first primary storage system;
determining, by the storage emulation subsystem during a second time period that is subsequent to the first time period, that a second predicted I/O operation measurement that is based on second I/O commands stored in the first primary storage system I/O queue exceeds the first primary storage system I/O operation threshold and, in response:
executing, by the storage emulation subsystem, at least some of the second I/O commands stored in the first primary storage system I/O queue to store second data in a first secondary storage system that is provided by the one or more of the plurality of storage devices; and
providing, by the storage emulation subsystem in the first metadata storage system that is provided by the one or more of the plurality of storage devices, second data mapping information that identifies at least one storage location in the first primary storage system associated with the second data stored in the first secondary storage system.

15. The method of claim 14, further comprising:
determining, by the storage emulation subsystem during a third time period that is subsequent to the second time period, that a third predicted I/O operation measurement that is based on third I/O commands stored in the first primary storage system I/O queue does not exceed the first primary storage system I/O operation threshold and, in response:
moving, by the storage emulation subsystem using the second data mapping information in the first metadata storage system, the second data from the first secondary storage system to the at least one storage location in the first primary storage system.

16. The method of claim 15, further comprising:
erasing, by the storage emulation subsystem in response to moving the second data from the first secondary storage system to the at least one storage location in the first primary storage system, the second data from the first secondary storage system and the second data mapping information from the first metadata storage system.

17. The method of claim 14, further comprising:
executing, by the storage emulation subsystem during a third time period that is subsequent to the second time period, at least one read I/O command that was received from at least one of the plurality of host devices and that identifies the second data using the at least one storage location in the first primary storage system;
retrieving, by the storage emulation subsystem from the first secondary storage subsystem using the second data mapping information in the first metadata storage system, the second data; and
transmitting, by the storage emulation subsystem to the at least one of the plurality of host devices, the second data.

18. The method of claim 14, further comprising:
storing, by the storage emulation subsystem, I/O commands, which were generated by at least some of the plurality of host devices and that are directed to a second primary storage system that is provided by the one or more of the plurality of storage devices, in a second primary storage system I/O queue;
determining, by the storage emulation subsystem during a third time period, that a third predicted I/O operation measurement that is based on third I/O commands stored in the second primary storage system I/O queue does not exceed a second primary storage system I/O operation threshold and, in response:
executing, by the storage emulation subsystem, at least some of the third I/O commands stored in the second primary storage system I/O queue to store third data in the second primary storage system;
determining, by the storage emulation subsystem during a fourth time period that is subsequent to the third time period, that a fourth predicted I/O operation measurement that is based on fourth I/O commands stored in the second primary storage system I/O queue exceeds the second primary storage system I/O operation threshold and, in response:
executing, by the storage emulation subsystem, at least some of the fourth I/O commands stored in the second primary storage system I/O queue to store fourth data in a second secondary storage system that is provided by the one or more of the plurality of storage devices; and
providing, by the storage emulation subsystem in a second metadata storage system that is provided by the one or more of the plurality of storage devices, fourth data mapping information that identifies at least one storage location in the second primary storage system associated with the fourth data stored in the second secondary storage system.

19. The method of claim 14, further comprising:
providing, by the storage emulation subsystem in response to executing the at least some second I/O commands to store the second data in the first secondary storage system, a respective data storage confirmation that identifies a respective storage location for each portion of the second data to the host device that provided that portion of the second data.

20. The method of claim 14, wherein the first secondary storage system and the first metadata storage system are provided by the same one or more of the plurality of storage devices.

* * * * *